United States Patent
Derickson

(10) Patent No.: US 12,205,447 B2
(45) Date of Patent: *Jan. 21, 2025

(54) ARTIFICIAL INTELLIGENCE (AI) BUILDING EMERGENCY GUIDANCE AND ADVISEMENT SYSTEM

(71) Applicant: Tabor Mountain LLC, Wilmington, DE (US)

(72) Inventor: Russell G. Derickson, Broomfield, CO (US)

(73) Assignee: Tabor Mountain LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,088

(22) Filed: Jul. 19, 2023

(65) Prior Publication Data

US 2023/0360506 A1 Nov. 9, 2023

Related U.S. Application Data

(63) Continuation of application No. 17/986,302, filed on Nov. 14, 2022, now Pat. No. 11,756,399, which is a
(Continued)

(51) Int. Cl.
*G08B 17/00* (2006.01)
*G08B 25/10* (2006.01)

(52) U.S. Cl.
CPC .............. *G08B 17/00* (2013.01); *G08B 25/10* (2013.01)

(58) Field of Classification Search
CPC ...... G08B 17/00; G08B 25/10; G08B 27/001; G08B 31/00; G08B 7/066; G06Q 10/047; G06Q 50/265; G06Q 90/205
See application file for complete search history.

(56) References Cited

U.S. PATENT DOCUMENTS 4,171,944 A 10/1979 Hirschmann
5,032,989 A 7/1991 Tornetta
(Continued)

FOREIGN PATENT DOCUMENTS

DE 102011083023 3/2013
WO WO 2010/054794 5/2010
(Continued)

OTHER PUBLICATIONS

Tedeschi, "For Home Buyers, an App to Assess a House's Attributes," NY Times, Apr. 4, 2012 [retrieved on Jan. 4, 2016]. Retrieved from the Internet: URL<http://www.nytimes.com/2012/04/05/technology/personaltech/for-home-buyers-an-app-to-assess-a-homes-attributes-app-smart.html?_ r=1>, 4 pages.
(Continued)

*Primary Examiner* — Omeed Alizada
(74) *Attorney, Agent, or Firm* — Barnes & Thornburg LLP

(57) ABSTRACT

The disclosed system can determine egress guidance during a building emergency using artificial intelligence (AI). The system can include sensors positioned throughout the building to detect building conditions and a computing system to determine egress guidance in the building. The computing system can perform operations including: receiving, from the sensors, information indicating the building conditions, detecting, based on processing the conditions, an emergency in the building, determining, based on applying AI techniques to the information, scenarios indicating potential spreads of the emergency, generating, based on the determined scenarios, egress guidance to assist users in safely egressing from the building. The egress guidance can include at least one egress strategy instructing the users to move along a pathway that avoids the emergency and the potential spreads of the emergency. The egress guidance can
(Continued)

be returned for presentation to the users in the building to assist in safely avoiding the emergency.

20 Claims, 12 Drawing Sheets

Related U.S. Application Data continuation of application No. 17/320,751, filed on May 14, 2021, now Pat. No. 11,501,621, which is a continuation of application No. 16/903,331, filed on Jun. 16, 2020, now Pat. No. 11,043,095.

(56) References Cited

U.S. PATENT DOCUMENTS

| | | | |
|---|---|---|---|
| 5,568,825 | A | 10/1996 | Faulk |
| 5,697,450 | A | 12/1997 | Stehling et al. |
| 5,794,653 | A | 8/1998 | DeSmet et al. |
| 5,881,115 | A | 3/1999 | Lipner et al. |
| 6,006,016 | A | 12/1999 | Faigon et al. |
| 6,029,751 | A | 2/2000 | Ford et al. |
| 6,154,133 | A | 11/2000 | Ross et al. |
| 6,195,002 | B1 | 2/2001 | Evans, Jr. |
| 6,281,790 | B1 | 8/2001 | Kimmel |
| 6,505,145 | B1 | 1/2003 | Bjornson |
| 6,648,077 | B2 | 11/2003 | Hoffman |
| 6,691,064 | B2 | 2/2004 | Vroman |
| 6,728,660 | B2 | 4/2004 | Bjornson |
| 6,763,148 | B1 | 7/2004 | Sternberg et al. |
| 6,947,797 | B2 | 9/2005 | Dean et al. |
| 6,957,110 | B2 | 10/2005 | Wewalaarachchi et al. |
| 7,032,435 | B2 | 4/2006 | Hassenflug |
| 7,185,711 | B2 | 3/2007 | Jackson |
| 7,209,817 | B2 | 4/2007 | Abdel-Malek et al. |
| 7,340,649 | B2 | 3/2008 | Angamuthu et al. |
| 7,541,938 | B1 | 6/2009 | Engelhaupt |
| 7,579,945 | B1 | 8/2009 | Richter et al. |
| 7,581,188 | B2 | 8/2009 | Hiles |
| 7,818,265 | B2 | 10/2010 | Loveland |
| 7,882,026 | B1 | 2/2011 | Zettner |
| 7,882,028 | B1 | 2/2011 | Devine et al. |
| 7,970,674 | B2 | 6/2011 | Cheng et al. |
| 7,990,965 | B1 | 8/2011 | Aggarwal et al. |
| 8,078,531 | B2 | 12/2011 | Mcelroy et al. |
| 8,378,817 | B2 | 2/2013 | Fox |
| 8,418,773 | B2 | 4/2013 | Cerrano |
| 8,473,917 | B2 | 6/2013 | Weatherhead |
| 8,567,757 | B2 | 10/2013 | Pitchford et al. |
| 8,577,131 | B1 | 11/2013 | Li et al. |
| 8,832,115 | B2 | 9/2014 | Smintina |
| 8,884,772 | B1 | 11/2014 | Zhang et al. |
| 8,973,670 | B2 | 3/2015 | Enk |
| 9,202,362 | B2 | 12/2015 | Hyland |
| 9,242,130 | B2 | 1/2016 | Hennegan |
| 9,403,046 | B2 | 8/2016 | Schmitt et al. |
| 9,536,231 | B2 | 1/2017 | Lerick et al. |
| 9,665,798 | B2 | 5/2017 | Watanabe et al. |
| 9,747,763 | B1 | 8/2017 | Scordato et al. |
| 10,553,085 | B1 | 2/2020 | Derickson |
| 10,726,696 | B1 | 7/2020 | DeLintt et al. |
| 10,789,665 | B2 | 9/2020 | Comello |
| 10,872,510 | B2 | 12/2020 | Derickson |
| 11,043,095 | B1 | 6/2021 | Derickson |
| 11,308,773 | B2 | 4/2022 | Paturu et al. |
| 11,501,621 | B2 | 11/2022 | Derickson |
| 2002/0057204 | A1 | 5/2002 | Bligh |
| 2002/0095269 | A1 | 5/2002 | Natalini et al. |
| 2002/0116202 | A1 | 9/2002 | Bantz et al. |
| 2002/0128728 | A1 | 9/2002 | Murakami et al. |
| 2002/0130784 | A1 | 9/2002 | Suzuki et al. |
| 2002/0166986 | A1 | 11/2002 | Remby et al. |
| 2003/0038846 | A1 | 2/2003 | Hori |
| 2003/0230415 | A1 | 12/2003 | Wilson |
| 2004/0064477 | A1 | 4/2004 | Swauger |
| 2004/0098279 | A1 | 5/2004 | Frazier |
| 2004/0247177 | A1 | 12/2004 | Rowe et al. |
| 2006/0044133 | A1 | 3/2006 | Lou |
| 2006/0069578 | A1 | 3/2006 | Borkowski et al. |
| 2006/0125632 | A1 | 6/2006 | Luebke |
| 2006/0184383 | A1 | 8/2006 | Davis et al. |
| 2006/0267788 | A1 | 11/2006 | Delany |
| 2006/0272830 | A1 | 12/2006 | Fima |
| 2006/0278410 | A1 | 12/2006 | Reilly |
| 2007/0005159 | A1 | 1/2007 | Borah |
| 2007/0008099 | A1 | 1/2007 | Kimmel et al. |
| 2007/0033108 | A1 | 2/2007 | Luhr |
| 2007/0053614 | A1 | 3/2007 | Mori et al. |
| 2007/0067412 | A1 | 3/2007 | Inui |
| 2008/0000649 | A1 | 1/2008 | Guirguis |
| 2008/0059082 | A1 | 3/2008 | Morrison |
| 2008/0114874 | A1 | 5/2008 | Meir et al. |
| 2008/0183704 | A1 | 7/2008 | Miller et al. |
| 2008/0215700 | A1 | 9/2008 | Pillar |
| 2008/0255862 | A1 | 10/2008 | Bailey |
| 2009/0009353 | A1 | 1/2009 | Schoettle |
| 2009/0089209 | A1 | 4/2009 | Bixler et al. |
| 2009/0121860 | A1 | 5/2009 | Kimmel |
| 2009/0219655 | A1 | 9/2009 | Korolyov |
| 2009/0327024 | A1 | 12/2009 | Nielsen et al. |
| 2010/0059236 | A1 | 3/2010 | Yee |
| 2010/0070097 | A1 | 3/2010 | Morgenstern |
| 2010/0274397 | A1 | 10/2010 | Lozier |
| 2010/0309004 | A1 | 12/2010 | Grundler et al. |
| 2010/0312604 | A1 | 12/2010 | Mitchell et al. |
| 2011/0035693 | A1 | 2/2011 | Ueno |
| 2011/0157486 | A1 | 6/2011 | Murata |
| 2011/0200461 | A1 | 8/2011 | Christensen |
| 2011/0312354 | A1 | 12/2011 | Nakamura |
| 2012/0056711 | A1 | 3/2012 | Hanrahan |
| 2012/0229283 | A1 | 9/2012 | McKenna |
| 2012/0276517 | A1 | 11/2012 | Banaszuk et al. |
| 2012/0047083 | A1 | 12/2012 | Qiao et al. |
| 2012/0325502 | A1 | 12/2012 | Hennegan |
| 2013/0063241 | A1 | 3/2013 | Simon |
| 2013/0157610 | A1 | 6/2013 | Vainik |
| 2013/0170417 | A1 | 7/2013 | Thomas et al. |
| 2013/0180139 | A1 | 7/2013 | Underwood |
| 2013/0180737 | A1 | 7/2013 | Tsuji |
| 2013/0201018 | A1 | 8/2013 | Horstemeyer et al. |
| 2013/0218864 | A1 | 8/2013 | Hong |
| 2013/0342361 | A1 | 12/2013 | Greene |
| 2014/0114621 | A1 | 4/2014 | Brigandi et al. |
| 2014/0244329 | A1 | 8/2014 | Urban |
| 2014/0267776 | A1 | 9/2014 | Duthu |
| 2014/0320282 | A1 | 10/2014 | Zhang et al. |
| 2014/0338927 | A1 | 11/2014 | Palle |
| 2014/0340223 | A1 | 11/2014 | Ilyin |
| 2015/0070192 | A1 | 3/2015 | Kates |
| 2015/0117701 | A1 | 4/2015 | Ross et al. |
| 2015/0137967 | A1 | 5/2015 | Wedig et al. |
| 2015/0165467 | A1 | 6/2015 | Muff |
| 2015/0371518 | A1 | 12/2015 | Mittal |
| 2016/0117646 | A1 | 4/2016 | Lerick |
| 2016/0117785 | A1 | 4/2016 | Lerick |
| 2016/0121151 | A1 | 5/2016 | Schmitt |
| 2016/0180663 | A1 | 6/2016 | McMahan et al. |
| 2016/0247369 | A1 | 8/2016 | Simmons |
| 2016/0303412 | A1 | 10/2016 | Schmitt |
| 2017/0076409 | A1 | 3/2017 | Lerick et al. |
| 2017/0234562 | A1 | 8/2017 | Ribbich et al. |
| 2017/0309142 | A1 | 10/2017 | Phillips |
| 2018/0364654 | A1* | 12/2018 | Locke ............... G05B 13/0265 |
| 2018/0365942 | A1 | 12/2018 | Molloy et al. |
| 2019/0086071 | A1 | 3/2019 | O'Reilly et al. |
| 2019/0145648 | A1 | 5/2019 | Sinha et al. |
| 2019/0295207 | A1 | 9/2019 | Day et al. |
| 2019/0379682 | A1* | 12/2019 | Overby .................. G06N 3/08 |
| 2020/0024902 | A1 | 7/2020 | Derickson |
| 2020/0242901 | A1 | 7/2020 | Jia et al. |
| 2020/0403861 | A1 | 12/2020 | Saad et al. |
| 2020/0413237 | A1 | 12/2020 | Stowell et al. |
| 2021/0056820 | A1 | 2/2021 | Derickson |

(56) References Cited

U.S. PATENT DOCUMENTS

| | | | |
|---|---|---|---|
| 2021/0271210 A1* | 9/2021 | Martinello | G06N 20/00 |
| 2021/0322806 A1 | 10/2021 | Fernandez-Orellana et al. | |
| 2021/0390838 A1 | 12/2021 | Derickson | |

FOREIGN PATENT DOCUMENTS

| | | |
|---|---|---|
| WO | WO 2011/130723 | 10/2011 |
| WO | WO 2014051456 | 4/2014 |

OTHER PUBLICATIONS

Thompson, "Understanding Zestimates and Making Them Work for You," RISMedia, publically available before Oct. 28, 2015 [retrieved on Jan. 4, 2016]. Retrieved from the Internet: URL<http://rismedia.com/2014-03-02/understanding-zestimates-and-making-them-work-for-you/>, 3 pages.

White, "Angie's List app makes finding service a snap," Angie's List, Mar. 10, 2014 [retrieved on Jan. 4, 2016]. Retrieved from the Internet: URL<http://www.angieslist.com/articles/angie-s-list-app-makes-finding-service-snap.htm>, 5 pages.

PCT International Preliminary Report on Patentability in International Application No. PCT/US2021/037426, mailed on Dec. 29, 2022, 12 pages.

\* cited by examiner

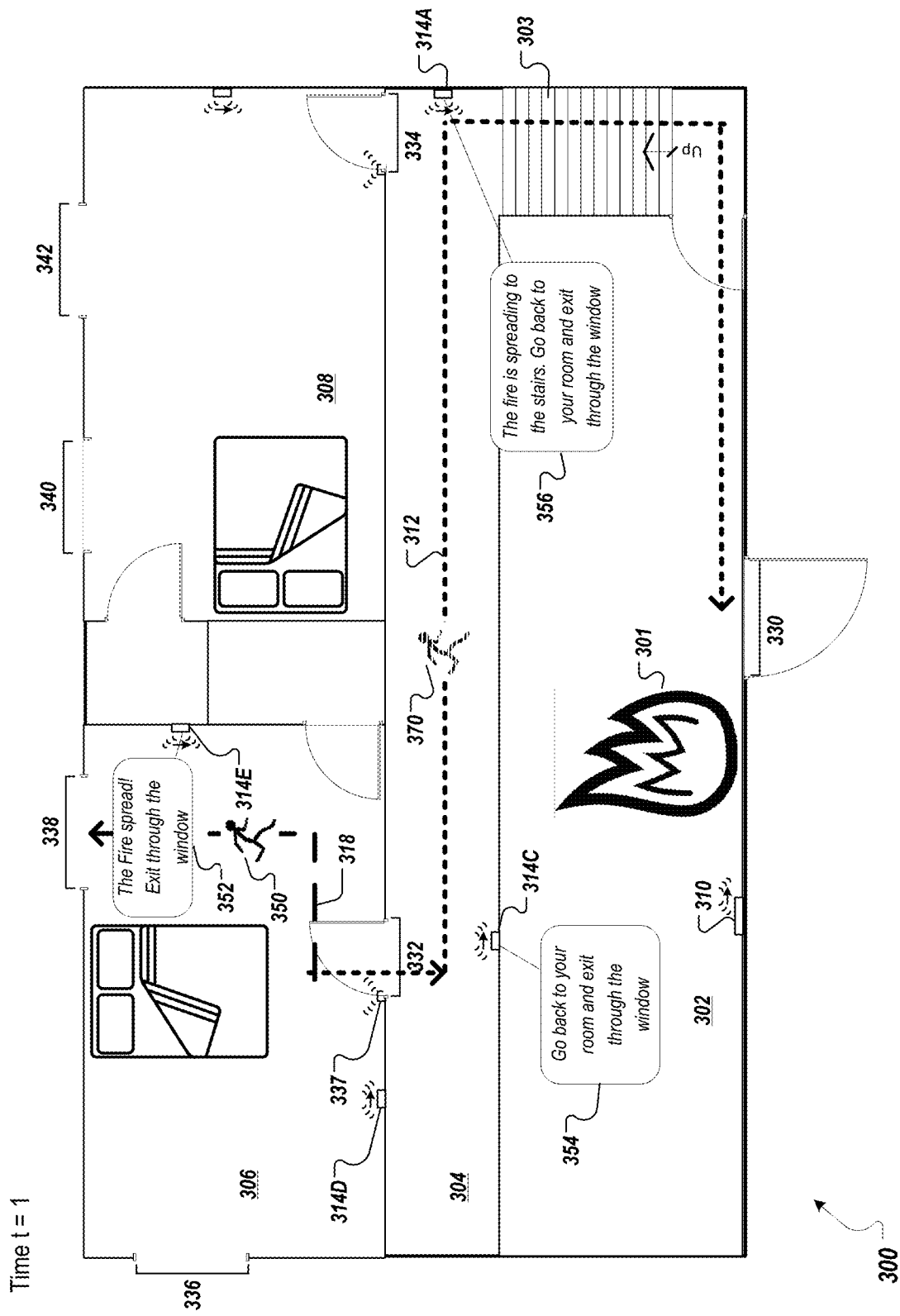

ARTIFICIAL INTELLIGENCE (AI) BUILDING EMERGENCY GUIDANCE AND ADVISEMENT SYSTEM

RELATED APPLICATIONS

This application is a continuation of U.S. patent application Ser. No. 17/986,302, filed on Nov. 14, 2022, which is a continuation of U.S. patent application Ser. No. 17/320,751, filed on May 14, 2021, now U.S. Pat. No. 11,501,621, which is a continuation of U.S. patent application Ser. No. 16/903,331, filed on Jun. 16, 2020, now U.S. Pat. No. 11,043,095, which is incorporated herein by reference in its entirety.

TECHNICAL FIELD

This document generally describes technology for safely guiding people out of a building during an emergency, such as a fire.

BACKGROUND

Fire districts strongly urge home and other building occupants to have a fire escape plan. Plan recommendation includes taking stock of each occupant in the building and identifying multiple, safe, and quick escape pathways from each room in the building. Today, many homes and other buildings are constructed with composite materials rather than real wood. As a result, these new constructions are more likely to be engulfed in flames in less time. It is important that occupants in the building know how to safely egress without chaotic scrambling before the entire building is in flames.

SUMMARY

This document generally describes technology for more safely guiding people out of buildings during emergencies, and for doing so in ways that are more robust and adaptable to readily changing conditions during an emergency. In particular, the disclosed technology provides building egress guidance in a way that not only takes into consideration current conditions within a building, but also anticipates changes to those conditions during the period of time when people will be exiting the building (or otherwise moving to safe locations within the building) so as to select egress pathways and strategies that will provide for safe egress during the entirety of the egress period. For instance, assume that a fire starts in a living room of a house while a person is sleeping in a bedroom and, at the time the fire is detected, egress through a front door of the house is available. However, simply guiding the person to the front door may not be optimal because, by the time the person moves from the bedroom to the front door, the fire may have spread to the front door, blocking the person's exit from the house and potentially also blocking retreat and other exits. The disclosed technology leverages machine learning and/or artificial intelligence (AI) techniques to predict the spread of fire (and/or other emergency conditions in a building) relative to the movement of people within a building in order to select egress pathways out of a building that will be safe during the entire duration while a person exits a building or otherwise moves to safety. The use of machine learning and/or AI techniques makes the disclosed technology performance-based, which is critical to ensure safety during a fire emergency. Rather than being a prescriptive approach, in which "one size fits all," performance-based techniques allows for improved flexibility and adaptation to different scenarios such that people are able to quickly and safely exit a burning building in any scenario. The performance-based techniques and technology described throughout this disclosure address specifics of each building, such as room layout, potential fire paths, fire loads in various zones, age and mobility of building occupants, and many other considerations in order to create comprehensive assessments to safely and quickly egress during a fire. Therefore, the disclosed technology is able to assess, both before a fire and in real-time, various fire scenarios in differing situations and design fire safety plans based on any identified and/or predicted risks.

The disclosed technology uses signaling devices and sensors that are distributed throughout a building in order to provide egress guidance to people located in a building when an emergency occurs. Such signaling devices can be located at or near doors, windows, and/or other junction points between different parts of a building (e.g., passageways between different rooms). Signaling devices can provide audio and/or visual information to people to guide them along a safe pathway that is selected to provide safe egress for the person, including anticipating and protecting the person from changing emergency conditions within the building. For example, signaling devices can include lights that are positioned at or near doorways and windows in a home, and that provide a simple visual cue (e.g., red light, green light) as to whether it is safe for a person to attempt egress through the doorway or window. Signaling devices can additionally and/or alternatively include speakers and/or other audio output devices that are capable of outputting audio commands to people, such as directing the person to egress through the front door or to egress through the window in the room. Other types and combinations of outputs are also possible.

The signaling devices can be part of a network of devices in a building that are designed to provide egress guidance to people in the building. The network of devices can include, for example, signaling devices, a controller device, and sensors that are positioned throughout the building. The controller device can receive information about environmental conditions in a building from the sensors, which may have wired and/or wireless communication pathways to the controller. The controller device may determine current conditions in the building from these signals, and may distribute information about the current conditions in the building to the signaling devices, which may use that information to select egress strategies and provide egress guidance to people located nearby. The signaling devices can be preconfigured with egress strategies that are predetermined by a server system (e.g., cloud based computer system) based on simulations of emergency scenarios in the building. For example, it may not be feasible or timely to simulate and predict the spread of a fire in a building when the fire is occurring, which could lead to poor and potentially unsafe egress guidance to people in the building. To avoid this and maintain optimal egress guidance, the processing of simulations, predicted spread of emergency situations, and resulting selection of egress strategies can be time shifted so that it is processed (e.g., processed on a server system) before an emergency situation occurs. This preprocessing can generate egress strategies that map current conditions to particular egress guidance that takes into account predictions on the spread of emergency conditions in the building. So during runtime, the current conditions in the building can be fed into the predetermined egress strategies to select an optimal egress pathway to use for guiding people out of the building, all without requiring the computational resources during the emergency situation to predict the spread of the emergency condition in the building and to simulate egress during those changing conditions. Signaling devices can be preloaded with these egress strategies, which can be the result of an assessment of the building, its layout, and conditions, and predictive analytics surrounding emergency conditions in the building and egress simulations.

In addition to the system configuration described in the preceding paragraph, preloading signaling devices with egress strategies can also permit them to provide safe egress guidance independently and autonomously, and without dependence on the network being available or other devices to provide guidance. For example, during a fire some components of an egress system may be destroyed. In a system where the signaling device is dependent on other devices, such destruction of egress system components could lead to a collapse of the system as a whole. In contrast, the disclosed technology permits for signaling devices to receive environmental conditions from other devices (to the extent available, and in addition to making their own determinations about environmental conditions) and to act independently using that information to provide egress guidance. Signaling devices can additionally include their own backup power sources, so that they are able to continue operating in the event an external power source to the signaling is unavailable. Such features can provide for a more robust system that is able to continue to provide safe and improved egress guidance to people in a building, and in a way that is not susceptible to one or more components going down during an emergency.

In some implementations, a system includes an egress modeling system configured to determine egress strategies to be used to guide people out of a building during a fire. The egress modeling system is configured to: receive a building layout for the building and user timing information for movement throughout the building; simulate, based on the building layout and user timing information, fire scenarios in the building; perform, based on the simulated fire scenarios, predictive analytics to determine an ability of a user to safely egress from a plurality of locations in the building; generate, based on the simulated fire scenarios and predictive analytics, egress strategies specific to each of the plurality of locations in the building, each of the egress strategies including multiple predetermined egress pathways for a location and corresponding logic for selecting among the multiple predetermined egress pathways based on current fire conditions within the building; generate, based on the modeled egress strategies, signaling instructions that are specific to each of the egress strategies, each of the signaling instructions being configured to output instructions to guide a user to take a corresponding egress pathway to exit the building; and output the egress strategies and signaling instructions. The system can further include signaling devices that are configured to be positioned at the plurality of locations in the building. The signaling devices can include a wireless communication interface configured (i) to receive a particular egress strategy and particular signaling instructions that are specific for the signaling device generated by the egress modeling system and (ii) to receive information identifying current fire conditions in the building, wherein the particular egress strategy includes a plurality of predetermined egress pathways and particular logic of selecting among the plurality of predetermined egress pathways; a processor configured to use the particular egress strategy to select a specific egress pathway from among the plurality of predetermined egress pathways based on the particular logic and the current fire conditions in the building; and an output system configured to visually or audibly output instructions to exit the building using the selected egress pathway using particular signaling instructions corresponding to the selected egress pathway.

Such a system can optionally include one or more of the following features. The egress modeling system can perform predictive analytics, including generating a plurality of fire simulations each with fires starting at different parts of the building, determining, using the plurality of fire simulations and predictive analytics, simulated fire spread times each identifying a length of time for the simulated fire to spread to other parts of the building for the plurality of fire simulations, determining, using the predetermined egress pathways and predictive analytics, simulated user egress times each identifying a length of time for a user to egress the building from different locations in the building using the predetermined egress pathways, and selecting, using the simulated fire spread times and the simulated user egress times, predetermined egress pathways that permit for safe egress of the building from each of the different parts of the building in each of the plurality of fire simulations. The processor of each of the signaling devices can select a specific egress pathway from among the plurality of predetermined egress pathways including: receiving a current fire location, comparing the current fire location with the plurality of fire simulations to identify an associated simulated fire spread time, determining, using the associated simulated fire spread time, the current fire location, and an associated simulated user egress time, that a user can safely egress the building using a specific egress pathway, and selecting the specific egress pathway. The processor of each of the signaling devices can select a specific egress pathway from among the plurality of predetermined egress pathways including: receiving a temperature value at each location along each egress pathway, comparing the temperature value at each location along each egress pathway with simulated user egress times at each location, and determining, based on the temperature value at each location being below a predetermined value within the simulated user egress times, that a specific egress pathway should be selected.

The user timing information can include information identifying how quickly the user can move in the building, the information being based on at least one of empirical data including measurements of the building layout, an age of the user, an agility level of the user, and a disability of the user. The current fire conditions in the building can include at least one of a fire temperature and a location of the fire. Visual output instructions can include LED lights that illuminate a pathway to exit the building corresponding to the selected egress pathway. Each of the signaling devices can receive current fire conditions in the building from a plurality of sensors positioned in the building. The plurality of sensors can be thermocouple heat sensors. The wireless communication interface of each of the signaling devices can be further configured to transmit, to a fire truck system, the selected egress pathway.

In another implementation, a method to determine egress strategies to be used to guide people out of a building during a fire includes receiving, at an egress modeling system configured to determine egress strategies to be used to guide people out of a building during a fire, a building layout for the building and user timing information for movement throughout the building, the building layout including signaling devices that are positioned at a plurality of locations in the building. The method can further include simulating, by the egress modeling system based on the building layout and user timing information, fire scenarios in the building.

The method can additionally include performing, by the egress modeling system based on the simulated fire scenarios, predictive analytics to determine an ability of a user to safely egress from the plurality of locations in the building. The method can also include generating, by the egress modeling system based on the simulated fire scenarios and predictive analytics, egress strategies specific to each of the signaling device at the plurality of locations in the building, each of the egress strategies including multiple predetermined egress pathways for a location and corresponding logic for selecting among the multiple predetermined egress pathways based on current fire conditions within the building. The method can further include generating, by the egress modeling system based on the modeled egress strategies, signaling instructions that are specific to each of the egress strategies, each of the signaling instructions being configured to output instructions to guide a user to take a corresponding egress pathway to exit the building. The method can additionally include outputting, by the egress modeling system, the egress strategies and signaling instructions for distribution to and use by the signaling devices during a fire.

Such a method can optionally include one or more of the following features. The predictive analytics can include generating a plurality of fire simulations each with fires starting at different parts of the building; determining, using the plurality of fire simulations and predictive analytics, simulated fire spread times each identifying a length of time for the simulated fire to spread to other parts of the building for the plurality of fire simulations; determining, using the predetermined egress pathways and predictive analytics, simulated user egress times each identifying a length of time for a user to egress the building from different locations in the building using the predetermined egress pathways; and selecting, using the simulated fire spread times and the simulated user egress times, predetermined egress pathways that permit for safe egress of the building from each of the different parts of the building in each of the plurality of fire simulations. The egress strategies can be configured for each of the signaling devices to select a specific egress pathway from among a plurality of predetermined egress pathways. The selection of the specific egress pathway using the egress strategies can include receiving, at one of the signaling devices, a current fire location; comparing, by the one of the signaling devices, the current fire location with the plurality of fire simulations to identify an associated simulated fire spread time; determining, by the one of the signaling devices using the associated simulated fire spread time, the current fire location, and an associated simulated user egress time, that a user can safely egress the building using a specific egress pathway; and selecting, by the one of the signaling devices, the specific egress pathway. During a fire, the signaling devices can be configured to locally select from among the egress strategies and signaling instructions based on one or more of (a) local sensor signals from local sensors that are part of the signaling devices and (b) fire location information transmitted wirelessly by one or more other devices located in the building. The egress strategies can be configured to permit for local selection of the egress strategies and the signaling instructions without involvement by or communication from the egress modeling system.

In another implementation, a method for communicating an egress pathway to a user during a fire includes, before a fire is occurring in a building: receiving, at a signaling device positioned at a particular location in the building, an egress strategy and signaling instructions that are specific to the signaling device at its particular location, wherein the egress strategy and signaling instructions are generated by an egress modeling system, wherein the egress strategy includes a plurality of predetermined egress pathways and logic of selecting among the plurality of predetermined egress pathways generated by the egress modeling system; storing, by the signaling device, the egress strategy and the signaling instructions in local storage on the signaling device; and continually monitoring, by the signaling device, for information identifying fire conditions in the building. The method can further include, upon detection of the fire conditions in the building: receiving, at the signaling device, information identifying current fire conditions in the building; selecting, by the signaling device using the locally stored egress strategy, a specific egress pathway from among the plurality of predetermined egress pathways based on the logic and the current fire conditions in the building; and outputting, by an output system that is part of the signaling device, visual or audible output instructions to exit the building using the selected egress pathway using a portion of the signaling instructions corresponding to the selected egress pathway.

Such a method can optionally include one or more of the following features. Selecting the specific egress pathway from among the plurality of predetermined egress pathways can include receiving a current fire location, comparing the current fire location with the plurality of fire simulations to identify an associated simulated fire spread time, determining, using the associated simulated fire spread time, the current fire location, and an associated simulated user egress time, that a user can safely egress the building using a specific egress pathway, and selecting the specific egress pathway. The current fire location can be determined based on communication from other signaling devices located within the building. Selecting a specific egress pathway from among the plurality of predetermined egress pathways can include receiving a temperature value at each location along each egress pathway, comparing the temperature value at each location along each egress pathway with simulated user egress times at each location, and determining, based on the temperature value at each location being below a predetermined value within the simulated user egress times, that a specific egress pathway should be selected. The specific egress pathway can be selected locally by the signaling device and without direction by the egress modeling system.

The details of one or more implementations are depicted in the associated drawings and the description thereof below. Certain implementations may provide one or more advantages. For example, egress strategies can be automatically generated and used in an emergency, such as a fire, even if occupants have not previously generated or addressed such egress strategies. These egress strategies can be generated by taking into consideration information pertaining to the occupants of a building, such as how quickly each of the occupants can egress from any particular room in the building, information about the building itself, such as a layout and/or floorplan, and other information, such as how fast a fire in any particular part of the building can grow, change in temperature, and spread to other parts of the building. Thus, egress strategies can be modeled using fire scenario simulations, predictive analytics, and some artificial intelligence in order to determine a plurality of the most optimal, safe, and non-chaotic pathways/routes out of the building during an emergency.

Dynamic egress guidance can also be provided that is based on real-time situational information about fire conditions within the building. Real-time information about a current fire condition can be exchanged between signaling devices located within the building such that each signaling device can evaluate a list of predicted egress strategies, select an optimal egress strategy, and instruct users in the building about which directions to take to safely exit the building before it is entirely engulfed in flames. The egress guidance can be audio and/or visual output, depending on the particular needs of any of the occupants in the building and/or depending on what devices and/or technology are installed in the building.

The features described herein can advantageously aid occupants in escaping the building during an emergency in a non-chaotic, productive fashion. During a fire, an occupant's thought process can be chaotic, but since the disclosed technology provides real-time guidance that is based in large on pre-analyzed scenarios, chaotic thoughts and irrational determinations by the occupant(s) can be avoided. Consequently, the described features ensure the occupants' safety and a non-chaotic, safe exit from the burning building. Moreover, the disclosed implementations can optimally provide for none or only one egress course correction in guiding occupants to safety during a fire.

The disclosed technology and techniques can further provide advantages in data analytics and improvement of the overall technology and/or techniques. Data collected and used by the disclosed technology can be beneficial to improve a design and techniques of the disclosed technology. The collected data can also be beneficial to various stakeholders, including but not limited to firefighters, fire safety engineers, home builders, the insurance industry, and municipalities. For example, firefighters can use the collected data to improve their training to better save people from fires, prevent fires from spreading to nearby buildings, and/or save the firefighters' lives. Other features, objects, and advantages of the technology described in this document will be apparent from the description and the drawings, and from the claims.

BRIEF DESCRIPTION OF THE DRAWINGS

FIGS. 3A-C are conceptual diagrams of a building floor map with predicted egress strategies that are used to instruct occupants in the building about how to safely exit during an emergency.

Like reference symbols in the various drawings indicate like elements.

DETAILED DESCRIPTION

The disclosed system enables the safe egress of occupants in a home or other building in the event of an emergency, such as a fire. The disclosed system can be extended to apply to non-residential buildings that are three to four stories, including but not limited to schools, office and retail buildings, and other limited scale buildings. Predictive analytics are incorporated into this system to guide occupants to safely egress without creating false starts and unproductive, chaotic scrambling on the way to safety.

Since modern homes are built by using more composite materials, the homes can go up in flames much faster than traditional homes that are built from wood. Simulating fire scenarios, predicting occupants' ability to escape the simulated fire scenarios, and modeling possible egress strategies then selecting an optimal egress strategy in real-time based on current conditions of a fire in the home are critical steps to minimize the need for any course corrections during the egress process. As a result, occupants can exit as quickly and calmly as possible before the home is engulfed entirely in flames. A goal of the disclosed system is that none or only one course correction may be necessary to guide occupants to safety.

As mentioned, modern/newer construction homes are more likely to reach full flame engulfment in less time than older constructions, based on the materials used to build the homes. For example, it may take a new construction only 3½ minutes to reach full flame engulfment while an older home may reach full flame engulfment in 15 minutes. Given a compressed 3½ minute to 5 minute time frame in modern homes from when a fire starts to the point that the flames engulf the entire structure, the guiding outputs of the disclosed system to occupants are designed to minimize course corrections in the egress process. This is in part made possible by the predictive analytics incorporated into the system to guide occupants to safe egress without creating false starts and unproductive, chaotic scrambling on the way to safety.

In some implementations, the disclosed system can include wearable devices for occupants experiencing sight or hearing deficiencies. Such devices can be beneficial to help these occupants safely egress from the home during an emergency when they typically cannot hear and/or see the audio/visual outputs (i.e. directions out of the home) described throughout this disclosure.

Figure 1:
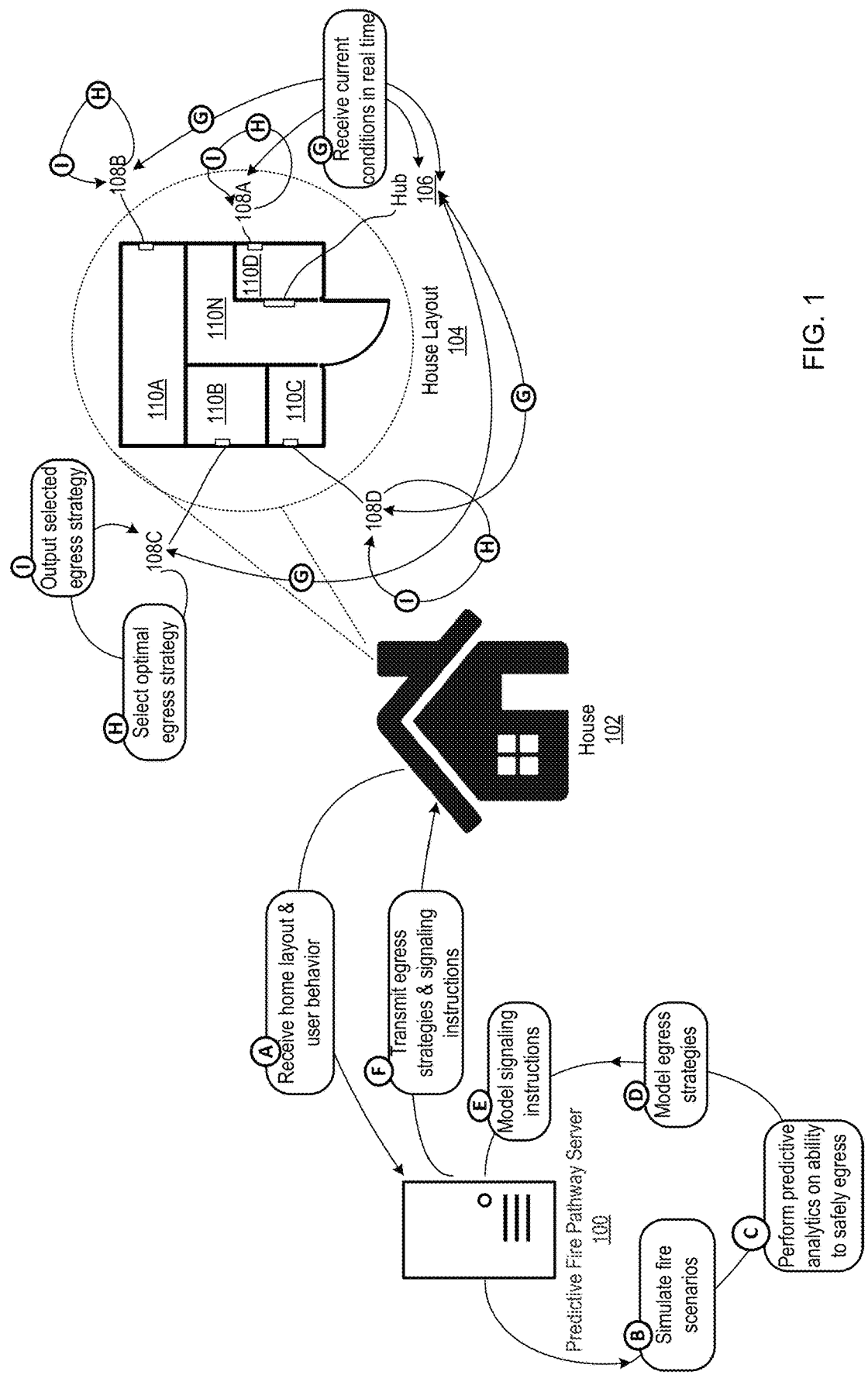
FIG. 1 is a conceptual diagram of an example system for predicting safe egress strategies out of a building and selecting an optimal egress strategy during an emergency.

Now turning to the figures, FIG. 1 is a conceptual diagram of an example system for predicting safe egress strategies out of a building and selecting an optimal egress strategy in real-time during an emergency. The system includes a predictive fire pathway server 100 and house 102. The house 102 has a house layout 104, which can include rooms 110A-N (e.g., kitchen, living room, bathroom, hallway, bedroom, etc.). The house layout 104 can be communicated/transmitted to the server 100 such that the server 100 can use the layout 104 in simulating fire scenarios (refer to step B).

In the house 103, one or more signaling devices 108A-D and a hub 106 are installed. The hub 106 can be a central control system that receives and communicates current conditions in real-time with the signaling devices 108A-D. In some implementations, the hub 106 can act like the signaling devices 108A-D by sensing real-time conditions of a fire in the house 102 and/or selecting an optimal egress strategy and outputting instructions to occupants about how to safely egress from the house 102. For example, the hub 106 can act as a signaling device in a room where there are no other installed signaling devices. The hub 106 can be located in a main foyer/hallway of the house 102 and thus can act as a signaling device for that foyer/hallway.

Preferably, each of the signaling devices 108A-D can be installed in each room in the house 102, as depicted in the house layout 104. The signaling devices 108A-D are configured to wirelessly communicate with each other in real-time via a communication such as WIFI, BLUETOOTH, or any other form of wireless connectivity. In some implementations the signaling devices 108A-D can communicate through a wired connection. This can be beneficial during emergencies in which a wireless connection (i.e., WIFI) is down and/or damaged by conditions of the emergency (i.e., a fire spreads and engulfs a router sending WIFI signals throughout the house 102).

As mentioned, the signaling devices 108A-D can communicate real-time, current information about conditions of a fire in the house 102. Current conditions can include a temperature of the fire, a temperature of a room that a signaling device is located in, and whether the fire spread to the room. In some implementations, the signaling devices 108A-D can include a monitor and/or one or more cameras to observe current conditions of the rooms that each of the signaling devices 108A-D are located in. Consequently, based on the captured footage, the signaling devices 108A-D can determine whether the fire started and/or spread to any of the rooms in the house 102. In other implementations, the signaling devices 108A-D can be connected to one or more cameras that are installed throughout the house 102. The one or more cameras can be wirelessly communicating with the signaling devices 108A-D. Alternatively, the cameras can communicate with the signaling devices 108A-D through a wired communication. A setup involving the use of cameras that are already installed and/or separately installed in the house 102 can be beneficial where the described system (the signaling devices 108A-D and the hub 106) is retrofitted to an existing house.

Preferably, the signaling devices 108A-D can include temperature sensors (i.e., thermocouple heat sensors) to read temperature values in each of the rooms in real-time. In some implementations, the signaling devices 108A-D can communicate with sensors that are installed in the house 102. These sensors can be installed around windows, doors, and/or at higher points in the rooms (i.e., near the ceiling). The sensors can also be installed prior to installation of the described system (the signaling devices 108A-D and the hub 106), wherein the described system is retrofitted to the house 102. In yet other implementations, the signaling devices 108A-D can have integrated temperature sensors and still communicate with additional temperature sensors that are installed throughout the house 102. This setup can be beneficial for redundancy and ensuring that accurate temperature readings are acquired and used by the signaling devices 108A-D in determining what egress strategy to select during an emergency. Current temperature information is beneficial for the signaling devices 108A-D to adopt the optimal egress strategy from the house 102. For example, if current temperature information indicates that the fire is at the back of the house 102, then a signaling device located at the front of the house can select an egress strategy that will not direct occupants towards the back of the house.

The signaling devices 108A-D can also be configured to output instructions to home occupants for safely egressing from the house 102. For example, the signaling devices 108A-D can include speakers that are integrated into the devices so that the devices can provide an audio output of instructions. The signaling devices 108A-D can also include integrated lights to display a visual output of instructions to egress from the house 102. In other implementations, the signaling devices 108A-D can communicate with one or more speakers and/or lights that are installed in the house 102 through a wired and/or wireless communication. In yet other implementations, the signaling devices 108A-D can communicate with wearable devices and other devices that are used by occupants experiencing a disability (i.e. blindness, deafness).

Moreover, the hub 106 can include a monitor for displaying potential fire scenarios to home occupants. For example, home occupants can view egress routes at any time, as desired, via the hub 106. The hub 106 can also be connected to a device within the house 102 (i.e., a TV) and serve as an input for changes to any occupant and/or home design information. For example, if a babysitter is in the house 102 one night, the home occupants can update the described system about the babysitter's presence via the hub 106. That way, the babysitter can be considered by the individual signaling devices 108A-D in the event of an emergency wherein the signaling devices 108A-D must select an egress strategy and output egress instructions to all occupants within the house 102. Information about occupants that can be updated and/or changed includes age (i.e., birthday just occurred) and agility level (i.e., an occupant no longer has crutches or a cast on his leg, an elder relative just moved in and is in a wheelchair, etc.).

Prior to customization and installation of the signaling devices 108A-D and the hub 106, the predictive fire pathway server 100 can explore different fire scenarios, identify vulnerabilities that compromise safety in the house 102, suggest remediation steps and processes for the identified vulnerabilities, predetermine most effective egress routes for potential fire scenarios, and establish a design and programming of the signaling devices 108A-D and the hub 106 to then be installed in the house 102. When the server simulates fire scenarios and identifies potential egress strategies (refer to steps B-C), the server 100 can use information including transit distances between each room and each exit point in the house 102, each occupant's mobile abilities (i.e., an occupant in a wheelchair is slower than a teen who is healthy and active), and other specifics related to the house layout 104, potential paths that a fire can spread throughout the house 102, how long it would take the fire to spread, etc.

Establishing safe egress strategies requires a comprehensive prior evaluation and analysis of the house 102 with respect to its layout (i.e., the house layout 104 or floorplan) and structure (i.e., whether the house 102 is a new construction with composite materials or whether the house 102 is an older house built with traditional materials such as natural/dense wood), age and physical capabilities of its occupants, and other factors. Performing such evaluation and analytics before real-time execution can be beneficial to determine all potential scenarios of how a fire would pan out and how all occupants would react. Consequently, in real-time, the optimal egress strategy can be selected to ensure that all occupants safely exit the house 102 without chaos and without having to correct/change a selection of the optimal egress strategy.

The server 100 can also be configured to guide homeowners to relocate persons with disabilities (i.e., elderly in a wheelchair) beforehand to a place in the house 102 that would enable safe and non-chaotic egress in the event of a fire. The server 100 can make such a determination and suggestions based on simulating fire scenarios and determining how each occupant in the house 102 would react and egress from the house 102 (refer to steps B-C). In some implementations, the server 100 can be configured to guide homeowners about making one or more changes to the house 102 itself that would ensure safety and proper egress for all occupants. For example, the server 100 may determine that a door should be installed in a doorway that separates two zones in the house 102 in order to create a firewall effect that provides for additional egress time from other parts of the house 102. In another example, the server 100 can determine that a fuel load in one zone of the house 102, for a given fire scenario, would prohibit safe egress for the occupants. Consequently, the server 100 can determine that that particular zone should be modified in some way to reduce the fuel load. The server 100's determinations can be beneficial to guide homebuilders in constructing better home designs or retrofits that reduce egress distances to exits and ensure increased occupant safety. This is particularly important today where homes are built with more composite materials rather than real wood and homeowners are seeking spacious, open architecture. In other words, homebuilders may still design open architecture and floorplans but have a better understanding and adaptation of such floorplans to shorter and safer egress paths in the event of a fire emergency.

Still referring to FIG. 1, the server 100 can receive home layout (i.e. the house layout 104, distances/measurements between different rooms in the house 102 and exit points, etc.) and user information (i.e., age, agility, and disabilities of each of the occupants, etc.) from the house 102 in step A. In this step, a homebuilder can upload this information about the house 102 and its occupants directly to the server 100. In other implementations, this information can be uploaded in real-time to the server 100 by an occupant in the house 102 and/or by updating/inputting/adding into the hub 106 information about the occupants or other home design information. Using this information, the server 100 can simulate fire scenarios in step B then perform predictive analytics on the ability of all of the occupants to safely egress in any of those fire scenarios in step C.

By simulating fire scenarios in step B, the server 100 can flush out potential safety vulnerabilities and determine appropriate egress strategies (i.e., routes, paths) for each of the simulated scenarios. The server 100 can simulate different fire scenarios to determine how quickly a fire would spread to other areas in the house 102 and how the spread of the fire would impact different exit points throughout the house 102. The server 100 can use information including temperatures of a fire when it starts, when it's at a peak, and when it's on a decline to simulate fire scenarios in the house 102. The server 100 can also use information about the house 102 to simulate fire scenarios, including when the house 102 was built, what materials were used to build the house 102, and the house layout 104.

Then, using specialized predictive analytics and elements of artificial intelligence, the server 100 can determine how well occupants can egress using predicted egress strategies in any of the simulated fire scenarios (step C). In some implementations, the predictive analytics utilizes a specialized time temperature equation that is mathematically deterministic, but can also incorporate stochastic analysis for added rigor and safety. Moreover, elements of AI can be incorporated with respect to predictive analytics in order to broaden its scope and ensure that it accommodates emerging technology and advances in modes of analysis. The power of predictive analytics lies in its ability to predict the rate of rise of temperature in a space that contains a fire, starting from fire initiation to maximum growth before ultimate decline. As its primary goal, the methodology utilized by the server 100 can predict times to maximum escape temperature and flashover. These parameters, coupled with information on home layout (i.e., house layout 104) versus the mobility and general physical and mental capabilities of occupants in the house 102, establish the viability of predicted egress strategies and routes.

The basic defining time-temperature equation for the example predictive analytics methodology utilized by the server 100 is as follows, in which its application is in the space with fire:

$$T = T_{max}[t/t_{max} \exp(1-t/t_{max})]^C$$

In which T is the computed temperature above initial room temperature at time, t, $T_{max}$ is the maximum expected temperature in a room with fire, $t_{max}$ is the expected time when $T_{max}$ is reached, and C is shape factor for the time-temperature curve. In most house fires, $T_{max}$ is about 1100° F. and $t_{max}$ is about 3½ minutes in a typical home fire. The values of $T_{max}$ and $t_{max}$ can be modified for known characteristics and conditions in a home as determined by the server 100. The factor C, which determines the critical shape of the time-temperature curve, is determined as follows:

$$C = [\ln T_1/T_{max}]/[\ln t_1/t_{max} + 1 - t_1/t_{max}]$$

In which $T_1$ is the temperature above initial room temperature at time, $t_1$, and all other variables are as previously defined. In the simulation performed by the server 100, $T_1$ is estimated from a rationally-based audit methodology that includes extremum analysis and critical ranges of possibility. At the signaling devices 108A-D, $T_1$ is determined from one or more thermocouple outputs during an actual fire via a sampling process, a vital distinction. The time, $t_1$, is chosen to be 15 seconds, for reasons elaborated later. In a fire, temperature is sampled every second or quicker, with a running 10-second time-averaging window applied to the process. That is, to determine $T_1$ at $t_1=15$ seconds, temperature data that is sampled starting at 10 seconds and ending at 20 seconds are averaged to calculate the value for $T_1$. Therefore, $t_1=15$ resides at the midpoint of the 10-second time-averaging window in determining $T_1$. The averaging process is critical to smoothing the data to yield a more accurate representation of $T_1$, because a fire fluctuates, hence so does temperature. Choosing a 10-second time-averaging window in determining $T_1$ is arbitrary, but is based on engineering experience and judgement in collecting temperature data in a fire setting. Also, a larger time-averaging window can reduce the available egress time.

A fire typically starts on a limited, localized scale, then experiences a sudden "pulse" growth for a period of time before reaching flashover, followed by final growth at a continuously reducing rate until it reaches its maximum level of intensity. After reaching its maximum, a fire goes into a declining stage as its fuel is depleted. The time at which temperature becomes impassible at a particular egress location, followed later by the temperature for when flashover occurs, are predicted by the server 100 as follows.

Figure 9:
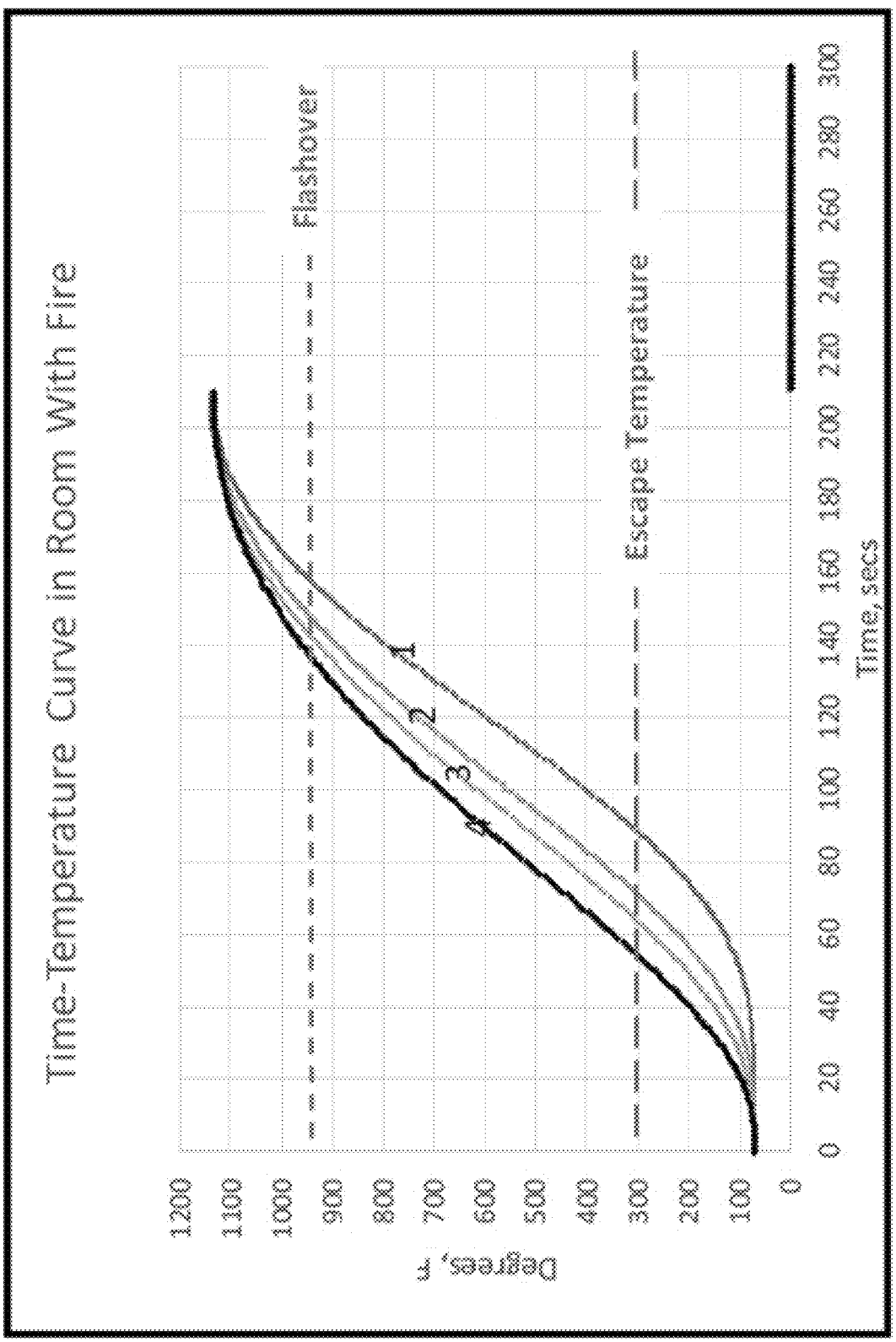
FIG. 9 depicts four time-temperature curves as a function of time for various values of $T_1$.

The precise time to maximum escape temperature, chosen to be 300° F. (149° C.) for dry conditions, and the specific shape of the curve depend on $t_{max}$, $T_{max}$, and $T_1$ at time $t_1$. As stated above, and repeated now for emphasis, the value of $T_1$ for a chosen time, $t_1$, which is 15 seconds in this example, is estimated by the server 100 when simulating fire scenarios in step B, as stated above, but measured directly in an actual fire in the signaling devices 108A-D. Using the equations from above, FIG. 9 depicts four time-temperature curves as a function of time for various values of $T_1$, assuming the values of $T_{max}$ and $t_{max}$ cited above. In FIG. 9, curves labeled 1, 2, 3, and 4 correspond to $T_1$ values of 0.1° F., 2° F., 5° F., and 15° F., respectively (0.06° C., 1.1° C., 2.8° C., and 8.3° C.). Time, $t_1$, equals 15 seconds in all cases.

The values for $T_1$ were chosen arbitrarily to elucidate the potential shapes of the time temperature curve and to assess the range of potential egress times. All four curves are "sigmoid" in basic shape, accurately representing the behavior of a real fire, but differ importantly in the information each provides on precise temperature history. If $T_1=0.1°$ F. (0.06° C.) after 15 seconds, the fire can be considered embryonic, while if $T_1=15°$ F. (8.3° C.) in the same timeframe, the fire is still in a relative infancy but not embryonic. The times in the respective curves at which the temperature in the room reaches the impassible point, 300° F. (149° C.) for dry conditions, are 70, 52, 45, and 35 seconds, respectively, in which $t_1=15$ seconds plus one half of the 10-second time-averaging window, totaling 20 seconds, have been subtracted.

Choosing $t_1=15$ seconds reasonably assures that enough temperature measurements have been undertaken with the thermocouples to determine accurate results with the predictive analytics methodology in a real fire. There is a feature in the methodology, as previously mentioned, that allows for one course correction in egress early in the process after a fire is detected in real-time. Regardless, the basic process is as follows. During the 20-second sampling time in determining $T_1$ in a real fire, the signaling devices 108A-D can be configured to alert occupants about the fire, providing initial guidance, and allowing them to prepare for egress. In some implementations, $t_1$ can be longer, i.e., 25-30 seconds, but given the typical 3½ minute time in which flames fully encompass a home, 15 seconds can be more prudent. In the final analysis, as performed by the signaling devices 108A-D, occupants ought to not be guided quickly to a point on an escape path that may become engulfed with flames by the time they arrive. For the four egress times cited above in FIG. 9, choosing conservatively that 35 seconds is available for egress along a path that passes through the room with the fire, that time span is insufficient for many cases unless the transit distance to safety is short and the occupant is physically mobile.

If the egress pathway is in a room adjacent to the room with fire, the flashpoint becomes the criterion for determining allowable egress time. If a closed door exists between rooms, then more time is available for egress. The times to flashover, assuming a typical residential flashpoint of 932° F. (500° C.) are 137, 127, 122, 115 seconds, respectively, for the four shown curves in FIG. 9. As before, $t_1=15$ seconds plus half of the 10 second averaging window have been subtracted from the predicted times when flashover occurs for the four curves. Again, choosing conservatively, the allowable time for egress is 115 seconds, which may be adequate in some instances, depending on transit distances, occupant mobility, and other factors described above. If not, and the fire is on the second floor, safe egress can be through a room window. The same reasoning can be applied to various other scenarios.

In the server 100 and the signaling devices 108A-D, the deterministic aspects of the above equations are complemented by stochastic processes and artificial intelligence (AI) in the form of neural networks and genetic algorithms, for example, to make the server 100 and signaling devices 108A-D more robust and resilient. Factors that are included in the server 100 and signaling devices 108A-D through stochastics and AI include such things as determining the possibility of (a) window blow out that can amplify fire flow paths, and (b) the effects of fuels types and fire loads on fire dynamics in various places in a home. The estimation of $T_{max}$ and $t_{max}$, and related parameters, are affected by these various factors.

To summarize the basic predictive analytics methodology described herein, when a fire ignites an initial sampling period of $t_1+5=20$ seconds occurs in which the installed signaling devices 108A-D can gather temperature data with the various thermocouples located strategically throughout the house 102. Once $T_1$ is determined, the second equation depicted above can be used to calculate C. Then the first equation depicted above can be used to predict the time that temperature will rise to its maximum allowable escape level, and the time at which flashover will occur. Escape and flashover times, with $t_1+5=20$ seconds subtracted, coupled with predetermined exit transit distances and estimated egress speeds for each home occupant, as determined by the server 100, considering instances of required assistance by able-bodied persons, allow the installed signaling devices 108A-D to provide proper and effective guidance for escape to safety.

The predictive analytics described throughout includes a feature for one course correction in a fire in the house 102, as previously discussed. After the initial sampling period of 20 seconds (i.e. $t_1+5$), the signaling devices 108A-D can continue to sample temperatures from the thermocouples in the room(s) with fire as well as those distributed in various rooms throughout the house 102. The hub 106 and/or the signaling devices 108A-D can determine at various points in time to what extent the initial predictions in temperature rise hold and whether they were low or high. If high, the initial assessment of allowable egress time holds. If low beyond a certain tolerance level, occupants can be instructed to return to their starting point and to exit from an egress window. This course correction can be valid for a short time after the initial sampling period, i.e., 15-30 seconds beyond the initial 20 seconds, depending on occupant mobility, egress distances, and other logistical factors. In the final analysis, conservative judgments can be made, by the signaling devices 108A-D, on egress guidance.

As a simple example, using predictive assessments, the server 100 can determine that it would take a particular occupant 30 seconds to get out through a front door from an upstairs bedroom. The server 100 can also determine that based on the materials used to build the house 102 and the house layout 104, the fire will spread to the front door or anywhere along the occupant's escape route in less than 30 seconds. So, the server 100 can determine alternative egress strategies that can safely lead the occupant out of the house 102 without coming into contact with the fire. In an example scenario where the fire starts or is located in the kitchen, the server 100 can determine that the fire can reach the front door in 1 minute. Based on this information, the server 100 can determine that the occupant can safely exit through the front door because it would take the occupant 30 seconds to do so. Thus, this exit route can become one of the modeled egress strategies (refer to step D). The goal of the server 100 is to create and predict optimal egress strategies that direct occupants away from the fire and out of the house 102 in the fastest and safest way possible. The server 100 is configured to predetermine egress pathways through the house 102 and predetermine contingencies should any of the predicted egress pathways not be the most optimal one during an emergency in real-time.

In some implementations, the use of predictive analytics by the server 100 does not necessarily entail artificial intelligence (AI). Rather, it can entail deterministic mathematics, conventional and/or clever applications of statistics, and/or AI. Moreover, AI itself can entail statistics and/or stochastics in its inner workings. In the example depicted throughout this disclosure, a deterministic mathematical approach is employed by the server 100 in simulating fire scenarios (refer to step B). However, in other implementations, the disclosed determinations of fire and/or temperature growth can be performed using artificial intelligence or artificial intelligence in combination with various forms of predictive analytics.

Next, still referring to FIG. 1, in step D, the server 100 can model egress strategies for each of the rooms in the house 102 based on the simulations and predictive analytics of steps B-C. The server 100 can perform if/else true/false logic to determine a list of key egress strategies for each of the rooms in the house 102. For example, the server 100 can determine that if fire exists in room A on a first floor of the house 102, then exit strategy 1 should be selected as an optimal exit strategy for exiting room B on a second floor of the house 102. As another example, if the fire is in room A on the first floor of the house 102 and it spread to at least one other room on the first level, then the server 100 can determine that exit strategy 2 should be selected as the optimal exit strategy for exiting room B on the second floor of the house 102. Then, in real-time execution, a signaling device can select any egress strategy from the list of key egress strategies made by the server 100 but would optimally select the egress strategy that the server 100 modeled as the optimal exit strategy in the particular scenario.

Once the list of key egress strategies is created, the server 100 can model signaling instructions that are associated with each of the key egress strategies in the list in step E. The server 100 can model instructions that can be visually outputted and/or outputted as audio. For example, based on occupant preference, instructions for exiting the house 102 along a particular egress strategy can be outputted using lights (i.e. LED lights). The lights can be displayed, from the signaling devices 108A-D and/or in any of the rooms in the house 102, depicting arrows or some other illumination that would indicate the appropriate path to take out of the house 102. In another implementation, the lights can be in the form of LED strips attached on top of a molding of one or more windows and/or doors in each of the rooms in the house 102. The LED strips can become illuminated to direct occupants safely out of the house 102 upon instruction from a signaling device and/or the hub 106 during an emergency. The LED strips can communicate wirelessly or through a wired connection with the signaling devices 108A-D and the hub 106. In yet another implementation, instructions to exit the house 102 can be outputted using audio, in which the signaling devices 108A-D and/or external speakers installed in the house 102 dictate instructions to occupants about exiting the house 102. In some implementations, audio output can come from a speaker embedded in one or more outlets throughout the house 102.

Once the signaling instructions are modeled, the server 100 can transmit the list of key egress strategies and their associated signaling instructions to the house 102 in step F. The signaling devices 108A-D can preload the lists of key egress strategies, wherein the list includes all possible strategies to exit a particular room that each of the signaling devices 108A-D is located in. As mentioned, these predicted egress strategies can foreshadow a time it would take any particular occupant to exit the house 102 and a time it would take for the fire to spread to any area of the house 102, thereby restricting or closing off any exit points in the house 102.

Each of the signaling devices 108A-D can receive the egress strategies and their associated signaling instructions that relate to exiting the particular room that each signaling device 108A-D is located in. For example, if signaling device 108D is located in a kitchen (i.e., room 110C) of the house 102, then the signaling device 108D will only receive a list of key egress strategies and signaling instructions that relate to exiting the kitchen during an emergency. Likewise, if signaling device 108B is located in a living room of the house 102, then that signaling device 108B will only receive the modeled egress strategies and signaling instructions that relate exiting the living room during an emergency.

In some implementations, the hub 106 can also receive all of the modeled egress strategies and signaling instructions, regardless of which room those strategies pertain to. In yet other implementations, the hub 106 may only receive modeled egress strategies and signaling instructions that relate to the room that the hub 106 is located within (i.e., in a foyer, entrance, or hallway of the house 102). Thus, in some implementations, the hub 106 can function and act like the signaling devices 108A-D.

The server 100 can determine which egress strategies are transmitted to which of the signaling devices 108A-D by assigning values to each of the rooms in the house 102. Then, each signaling device 108A-D can be assigned a value that corresponds to the value of each of the rooms. For example, the kitchen can be assigned a value of 1 and the signaling device 108D, which is located in the kitchen, can likewise be assigned a value of 1. Once the server 100 generates a list of key modeled egress strategies for the kitchen, the server 100 can determine which signaling device 108A-D is located in the kitchen based on its assigned value and then transmit the list of egress strategies associated with the kitchen to that signaling device (in the example provided above, the signaling device 108D is located in the kitchen so the signaling device 108D and the kitchen have corresponding identification values).

Once each of the signaling devices 108A-D receive the modeled egress strategies and signaling instructions, the signaling devices 108A-D can communicate and receive current conditions in real-time from the other signaling devices 108A-D and the hub 106 (step G). As previously discussed, each of the signaling devices 108A-D can collect real-time conditions on their own by using sensors or other devices integrated into each of the signaling devices 108A-D. Alternatively, the signaling devices 108A-D can communicate real-time conditions with each other as well as with sensors and other devices already installed in the house 102 (i.e., smart smoke detectors, thermocouple heat sensors, etc.). Based on the sensed/received current conditions, the signaling devices 108A-D can make real-time determinations of which egress strategies are appropriate for safe egress from the house 102.

For example in the example mentioned above, if a fire is sensed by the signaling device 108D in the kitchen based on a sudden increase in temperature in the kitchen, then the signaling device 108D can communicate this condition in real-time to the other signaling devices 108A-D as well as the hub 106. Other signaling devices 108A-D can communicate additional conditions in real-time, including but not limited to a temperature of a room and/or a change in temperature of the room, wherein the rooms are nearby the kitchen. The signaling devices 108A-D can use this information to determine whether the fire is spreading from the kitchen, whether it is getting stronger, and/or whether it's getting hotter.

Based on communication of conditions in real-time in step G, each of the signaling devices 108A-D can then select an optimal egress strategy from the list of modeled egress strategies associated with the particular room that each of the signaling devices 108A-D is located in (step H). For example, in this step H, the signaling device 108D selects the best egress strategy that would allow an occupant to safely exit the house 102 without coming into contact with the fire that started in the kitchen, regardless of where the fire spreads. Because of the simulating and predicting performed by the server 100 in steps B-D, the signaling device 108D's selection would be accurate such that the signaling device 108D would not have to correct its egress strategy selection in real-time. After all, the server 100 has simulated a fire scenario like the present one and predicted how an occupant would egress in that particular scenario (refer to steps B-C). The possibility of error in selection by the signaling devices 108A-D would consequently be minimal, if not nonexistent. In the event that course correction is required in real-time, then a signaling device should only have to make a single course correction.

In the event that the single course correction is necessary, the signaling device can continue to receive samples of temperature values from sensors throughout the house 102 as well as from the other signaling devices 108A-D and the hub 106 to make an accurate correction of the signaling device's strategy selection. In some implementations, the hub 106 (or any of the signaling devices 108A-D) can determine at various points in time to what extent initial predictions in temperature rise hold and whether they are high or low. If high, then the initial assessment of allowable egress time, as determined by the server 100, and selected egress strategy, as determined by a signaling device in real-time, holds. If low beyond a certain predetermined level, then the hub 106 and/or any of the signaling devices 108A-D can select a different egress strategy and instruct occupants to return to their starting points and/or follow new directions associated with a different selected egress strategy.

As mentioned, thermocouple heat sensors placed judiciously throughout the house 102 can sense temperatures in different rooms in real-time. These temperature readings can be transmitted to each of the signaling devices 108A-D during the emergency and/or before the emergency. In step H, each signaling device 108A-D can estimate a rate of temperature rise along each of the modeled egress strategies to determine which of the modeled egress strategies is appropriate, safe, and ought to be selected. The signaling devices 108A-D can predict the rate of rise in temperature starting from fire initiation to maximum growth before the fire's ultimate decline. This prediction can also be performed by the server 100 before run-time execution. A temperature at any given time can be determined via thermocouple heat sensor outputs during an actual fire via a sampling process. Temperature readings from the sensors can be collected over a period of time then averaged in order to smooth the data and yield a more accurate representation of the temperature at any given time. Consequently, the signaling devices 108A-D can predict times to maximum escape temperature and flashover, which, as mentioned, is also performed by the server 100 before run-time execution. Coupled with predetermined egress transit distances and estimated egress speeds for each occupant (which was determined by the server 100 in steps B-D), the signaling devices 108A-D can accurately select and provide for proper and effective guidance to safety during an emergency in real-time.

As mentioned the determinations concerning rise of temperature can be performed by the server 100 beforehand in step C. When the server 100 determines a rise in temperature, it can employ a rationally-based audit methodology that includes extremum analysis and critical ranges of possibility to determine a temperature at any given time in each of the rooms in the house 102. Prediction of what temperatures will be at various critical points along an egress strategy (i.e., route, path) and at a destination exit point is important to ensure that occupants can be safely guided to safety without chaos or confusion. These are critical determinations performed by the server 100 in order to determine occupants' ability to safely egress during any fire scenario and model key egress strategies (refer to steps C-D).

For example, if the sensed, determined, or predicted temperature values along an egress strategy are below a maximum escape level at all points along that strategy and will remain so until all occupants can reach the exit, then the server 100 can determine that that egress strategy is an optimal strategy in the list of modeled egress strategies provided to a signaling device. To make this determination, the server 100 needs to know a time before the temperature becomes too hot at each point along the egress strategy, a transit distance, and a speed at which an occupant is reasonably able to move along the egress strategy to safety. If conditions are not suitable to exit via one of the modeled egress strategies, with an embodied safety time factor to accommodate for any uncertainties, then the server 100 can determine that a different egress strategy in the list of modeled strategies may be the better option in the even of an emergency. These steps described can also be performed in real-time by each of the signaling devices 108A-D in step H, when each of the signaling devices 108A-D must select the optimal egress strategy from the list of modeled egress strategies received from the server 100.

After each of the signaling devices 108A-D selects the optimal egress strategy associated with the particular room that the signaling device 108A-D is located in (step H), each signaling device 108A-D is configured to output egress instructions associated with the selected egress strategy in step I. For example, if the fire starts in the kitchen where the signaling device 108D is located, then the signaling device 108D will output instructions associated with the selected egress strategy for exiting the house 102 from the kitchen. In the same example, the signaling device 108B, located in the living room of the house 102, will output instructions associated with the selected egress strategy for exiting the house 102 from the living room. As previously mentioned, output of the instructions for the selected egress strategy can be visual and/or audio. The signaling devices 108A-D can make this determination based on information about the occupants, such as whether an occupant is blind, deaf, or prefers one form of output over the other. In some implementations, the signaling devices 108A-D may only have one form of output based on the devices installed in the house 102. For example, if every room in the house 102 has a speaker installed in/integrated into an outlet, then audio output is used. If every room in the house 102, or some of the rooms, has LED strips installed on molding of doors and/or windows, then a visual output is used. In yet other examples, output can be both audio and visual, which can be beneficial in situations where, for example, there is a lot of smoke that makes it harder for occupants to see lights as time goes on.

In other implementations, the signaling devices 108A-D can select an optimal form of output based on a current condition in real-time. For example, if the signaling device 108D senses that there is a lot of smoke in the kitchen that obstructs ones vision, it may be hard for an occupant in the kitchen to see any visual outputs. Therefore, in this example, the signaling device 108D can select an audio output of egress instructions rather than a visual output.

Each of the signaling devices 108A-D perform steps H and I. In some implementations, the hub 106 can also perform steps H and I (not shown), especially in situations where the hub 106 is located within a room in the house 102 that does not have its own signaling device 108A-D and wherein the hub 106 functions like the signaling devices 108A-D. In some implementations, the house 102 may not have the hub 106 but rather can designate one of the signaling devices 108A-D to act as the hub 106 or a central control system.

The system described herein can further include features for assisting disabled occupants. For example, a deaf occupant can wear or carry a device (i.e. a wearable device or a hand-held device) that uses vibrational signals to guide the occupant via a selected egress strategy. As another example, a blind occupant can wear or carry a device that provides continuous audible verbal messages for egress instructions (i.e., to supplement other fixed audio devices or act as a substitute if fixed audio devices are not functioning within the house).

The system described herein can also include other features. For example, some or all devices, such as the signaling device 108 and the hub device 106, can include battery backup (i.e., lithium) for use in case of a power outage affecting some parts or all of the house. Various hardware and software security measures can further be employed to prevent local and/or remote hacking. Security measures can prevent unauthorized users (i.e., would-be thieves) from obtaining information about a house floor plan, for example. In some implementations, the system described herein can be used as a stand-alone system for a fire egress and guidance system. Other configurations for the system are also possible.

Figure 2:
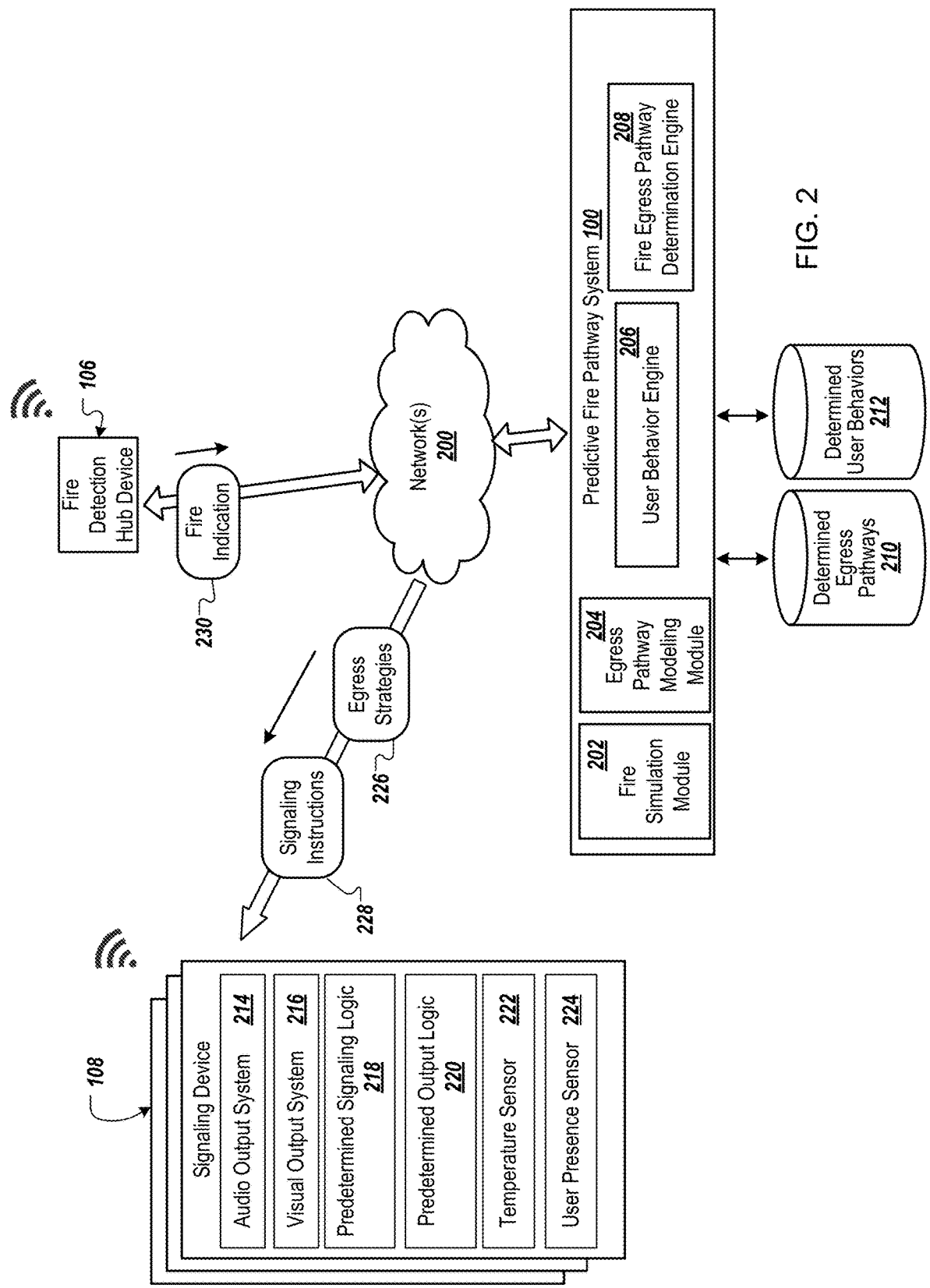
FIG. 2 is an example system diagram of the embodiment of FIG. 1.

FIG. 2 is an example system diagram of the embodiment of FIG. 1. The system includes a predictive fire pathway system 100 (FIG. 1's predictive fire pathway server 100), a fire detection hub device 106 (FIG. 1's hub 106), and at least on signaling device 108 (FIG. 1's signaling devices 108A-D) that communicate via network(s) 200. The system 100, hub device 106, and signaling device 108 can use one or more wired and/or wireless communications (i.e. BLUETOOTH, WIFI) in the network(s) 200.

In some implementations, the hub device 106 can detect whether there is a fire in a house and provide an associated fire indication 230 to the predictive fire pathway system 100 as well the signaling device 108. The hub device 106 can be of various configurations and can include a smoke detector and/or heat sensor (i.e. temperature sensor, infrared sensor, etc.) in order to detect whether there is a fire and where in the house the fire is located. Further, the hub device 106 and/or signaling device 108 can be of various configurations, such as motion sensors, cameras, door sensors, window sensors, door locks and window locks, other security devices, etc.

The predictive fire pathway system 100 can include a fire simulation module 202, an egress pathway modeling module 204, a user behavior engine 206, and a fire egress pathway determination engine 208. The system 100 can also communicate wirelessly and/or wired with a determined egress pathways database 210 and a determine user behaviors database 212. In other implementations, the system 100 can alternatively store information associated with its functions in a cloud-based network and/or use the cloud-based network as backup storage.

The user behavior engine 206 can collect information about home occupants from the hub 106, signaling device 108, or other sources (refer to FIG. 1 step A). For example, when the hub 106 and signaling device 108 are installed in the house, an installer (i.e., homeowner, homebuilder, etc.) can input/transmit information about the home's occupants directly to the predictive fire pathway system 100. Some of the information that the user behavior engine 206 can collect includes an age, agility level, and any possible disabilities associated with each occupant. The user behavior engine 206 can then determine key characteristics of the occupants that may impact their ability to safely egress from the house during an emergency. For example, if an elderly person in a wheelchair lives in the house, then the user behavior engine 206 can determine that this factor will change how the elderly person can egress from the house during a fire. In other words, it may take longer for the elderly person to egress. The user behavior engine 206 can also use this type of occupant information in order to suggest to a homebuilder, homeowner, or any other occupant about what modifications can be made directly within the house to ensure occupant safety. For example, if the elderly person lives in the house, the user behavior engine 206 can create a suggestion, communicated to the hub device 106 to then be outputted for display, that the elderly person should have a bedroom on a first floor of the house and/or close to a major exit of the house (i.e., back door, front door).

Once the user behavior engine 206 determines the user information that is key to egressing safely out of the house during an emergency, that user behavior information can be stored in the determined user behaviors database 212. The information stored in the database 212 can be updated at any time by a user inputting updated and/or new information into the hub device 106. For example, if a baby is added to a family living in the house, one of the occupants can update the occupant information via the hub device 106 such that when egress pathways are modeled by the module 204, the module 204 can take into consideration the fact that a baby is now one of the occupants that needs to safely egress from the house during an emergency.

Still referring to FIG. 2, the fire simulation module 202 can simulate potential fire scenarios in the house based on a house layout, what materials the house is built with, user behavior information, and other information as previously mentioned (refer to FIG. 1 step B).

The egress pathway modeling module 204 can be configured to model/create potential egress strategies out of the house based on the simulated fire scenarios from the module 202 and taking into consideration the occupant information stored in the determined user behaviors database 212 (refer to FIG. 1 step C). The module 204 can use predictive analytics and components of artificial intelligence to predict abilities of each of the occupants to exit the house during an emergency, no matter the simulated fire scenario.

The fire egress pathway determination engine 208 can be configured to select one or more of the predicted egress pathways from the module 204 that can be used during an emergency (refer to FIG. 1 step D). In this step, the engine 208 can model the predicted egress strategies for each of the rooms in the house, thereby creating a list of key potential egress strategies that the signaling device 108 can choose from in real-time. The engine 208 can also be configured to model signaling instructions associated with each of the potential egress strategies in the list (refer to FIG. 1 step E). In some implementations, as previously discussed, the engine 208 can list the egress strategies in order from optimal to least optimal exit strategy in any given fire scenario.

Once the engine 208 determines a list of egress strategies associated with each room in the house, the list of egress strategies, as well as the associated signaling instructions, can be stored in the determined egress pathways database 210. Over time, if the module 204 predicts new egress strategies and the engine 208 models, selects, and/or determines new strategies that can be implemented by the signaling device 108, then egress strategies stored in the database 210 can be updated to reflect such changes/additions. Thus, the module 204 operates to bolster functioning and effectiveness of the system 100 by adjusting the system 100 for changing circumstances in occupant status, occasions with guests, and/or changes in the home itself (i.e., renovating the house, adding room(s), removing room(s), etc.). As such, egress strategies can be modified rapidly with changing circumstances.

After egress strategies are determined and stored, the system 100 can communicate the egress strategies 226 and the associated signaling instructions 228 to the signaling device 108 (refer to FIG. 1 step F).

The signaling device 108 can include an audio output system 214, a visual output system 216, a predetermined signaling logic 218, a predetermined output logic 220, a temperature sensor 222, and a user presence sensor 224. Upon receiving the egress strategies 226 and signaling instructions 228, the signaling device 108 can collect current conditions in real-time (refer to FIG. 1 step G). The temperature sensor 222 (i.e. heat sensor, infrared sensor, etc.) can get a read on a temperature of the room that the signaling device 108 is located within. Based on the sensed temperature, the signaling device 108 can determine whether there is a fire in the room and/or whether a fire is spreading/getting closer to the room. Moreover, the user presence sensor 224 can determine whether an occupant is located within the room. If the occupant is sensed in the room, then the signaling device 108 can determine that it must output some instructions to that occupant to safely egress from the room.

The predetermined signaling logic 218 can then select an optimal egress strategy from the list of egress strategies 226 (refer to FIG. 1 step H). This selection can be based on information sensed in real-time by the temperature sensor 222 and/or the user presence sensor 224, as previously discussed throughout this disclosure. Once an egress strategy is selected, the predetermined output logic 220 can determine which form of output should be used to output the egress instructions. This determination can be based on user information, preferences, and/or what devices are installed within the room that the signaling device is located in. Based on that determination, the signaling instructions can be outputted using the audio output system 214 and/or the visual output system 216 (refer to FIG. 1 step I).

Figure 3A:
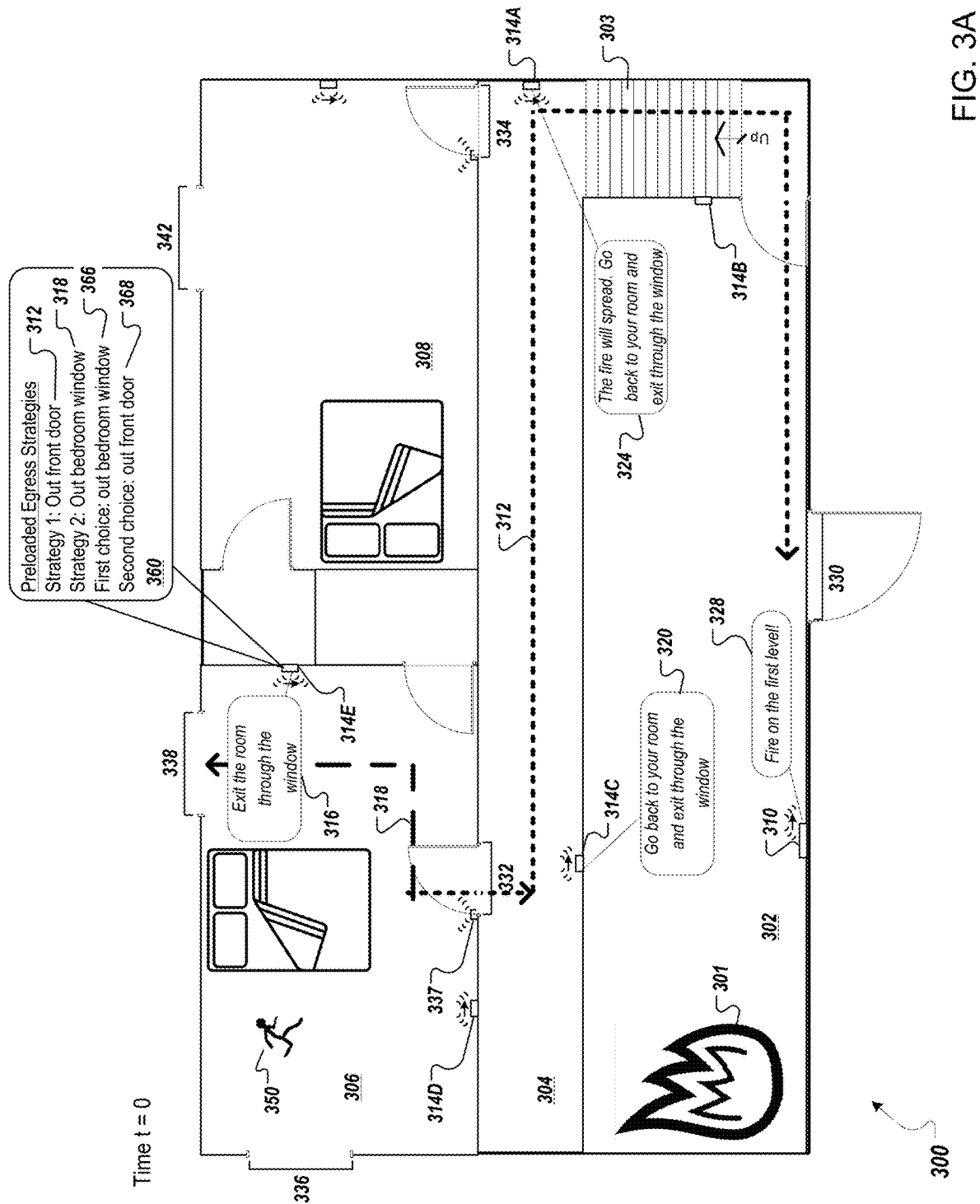
Figure 3C:
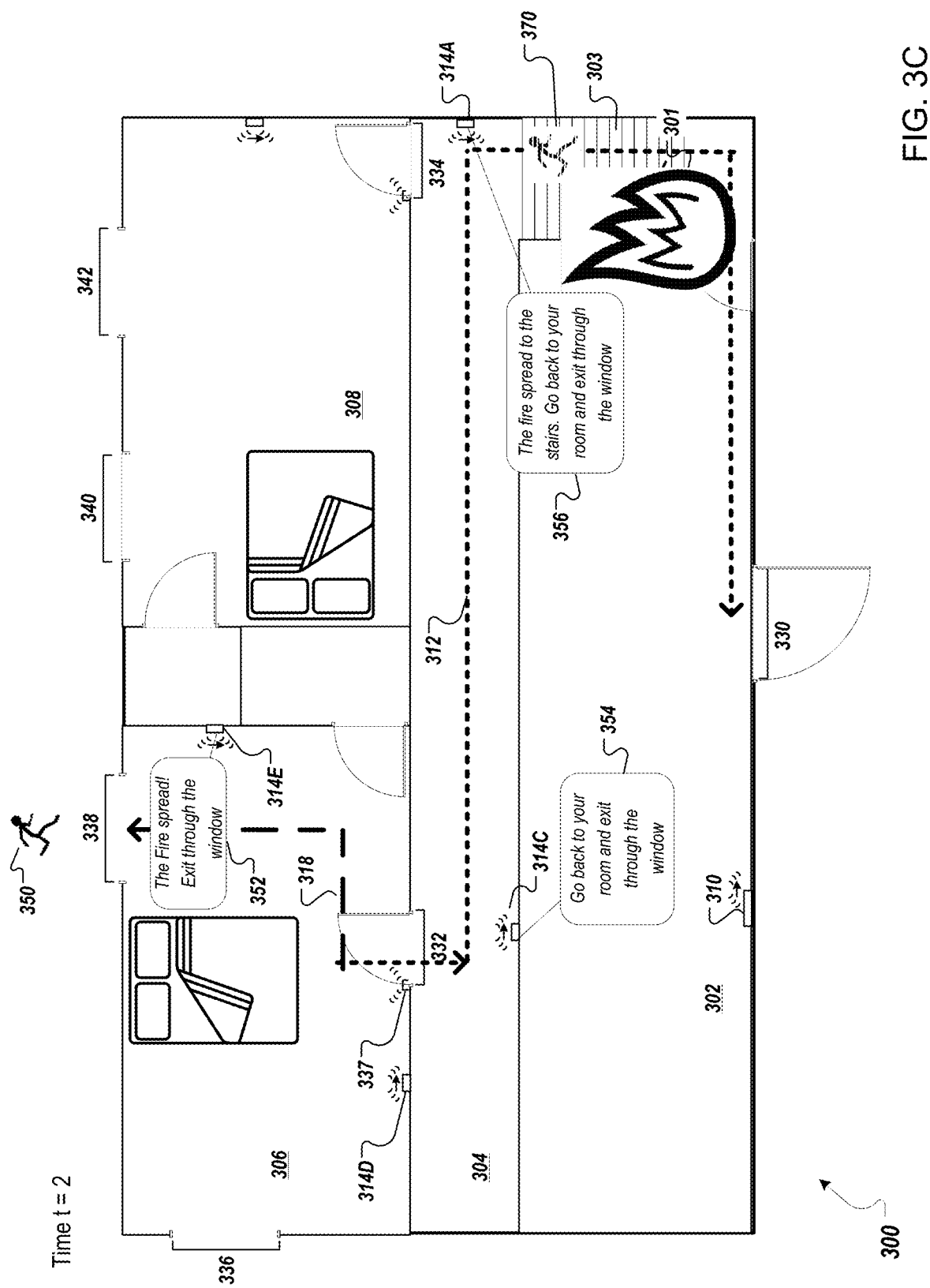

FIGS. 3A-C are conceptual diagrams of a building floor map with predicted egress strategies that are used to instruct occupants in the building about how to safely exit during an emergency. As depicted, one or more devices can be located in each of the rooms in a house 300, including hub 310 and signaling devices 314A-E. The signaling devices 314A-E and hub 310 can communicate via a wired and/or wireless connection, as previously discussed.

In some implementations, rooms, such as a first bedroom 306, can include additional sensors, such as a sensor 337. The sensor 337 can detect a presence of a fire, a presence of an occupant, temperature of the bedroom 306, and other current conditions in real-time. For example, the sensor 337 can be a motion detector and/or a smart thermostat. In yet other implementations, the sensor 337 can be a smoke detector and/or a smart smoke detector, which can act as a primary sensor for determining an existence of a fire and its location. In other implementations, the sensor 337 can be a thermocouple heat sensor, which is beneficial to sense and report temperatures at various locations as a fire grows and spreads throughout the house 300. Optionally, the house 300 can include a sensor such as sensor 337 in each of the rooms in the house 300 along with additional sensors for redundancy (i.e., a sensor can be placed inside each bedroom at a door to each bedroom and a third sensor can be placed in a hallway between both bedrooms). Thermocouple heat sensors can also be placed along a stairway 303 and throughout the house 300 with judicious placement near a ceiling height since heat rises and distributes itself. As a result, such sensors are less likely to be visible to home occupants but can still be effective in obtaining accurate temperature readings in real-time.

As discussed, the hub 310 and/or signaling devices 314A-E can also include integrated motion detectors and/or other types of sensors such that individual sensors, such as the sensor 337, are not required or heavily relied upon. In general, other devices that can communicate real-time conditions with the hub 310 and signaling devices 314A-E can include smart outlet covers, smoke detectors, sensors, etc. Moreover, any given device, such as a signaling device, can include a motion detector as well as any other devices discussed herein.

In some implementations, the hub 310 is a master monitoring system and other monitoring devices, such as the signaling devices 314A-E are secondary monitoring systems. In some implementations, each secondary monitoring system can take over control as a new master monitoring system if the hub 310 is out of commission (i.e., consumed by fire). A new master monitoring system can operate using last-received information from the hub 310 and information received from other secondary monitoring systems. In some implementations, all monitoring systems located in the house 300 can act as peer devices (i.e., pre-disaster and/or during a disaster), with no device designated as a master monitoring device or hub 310.

Additionally or alternatively, devices in the house 300 can connect to a cloud based service, to upload and download information provided by other devices, so that a given device can send and receive data even if a home network is compromised, for example, by fire. During a disaster, devices may not be able to communicate on a local network, but a smart thermostat or signaling device in one room and the hub 310 may each be able to communicate via the cloud service (i.e., using a cellular network) and thereby exchange information with each other, using the cloud service as an intermediary.

FIG. 3A is a drawing of the house 300 that includes a lower level 302 and the stairway 303 that goes to an upper level at time t=0. The upper level includes a hallway 304, a first bedroom 306, and a second bedroom 308. In this example, at time t=0, two egress strategies, a first strategy 312 and a second strategy 318, have been predicted, determined, and preloaded into a signaling device 314E. The signaling device 314E receives information 360 (refer to FIGS. 1-2) which can include (1) a list of potential egress strategies to select from (the first predicted egress strategy 312 and the second predicted egress strategy 318), (2) which strategy the signaling device 314E selects as an optimal egress strategy, a first choice 366, and (3) which strategy would be second best in case of an error in the signaling device 314E's selection, a second choice 368.

In some implementations, the bedroom 306 can include LED lights above a door 332 and above windows 338 and 336, in addition to a speaker (i.e., integrated into the signaling device 314E), and sensors such as the sensor 337, which can be a thermocouple heat sensor. Lights, speakers, and/or sensors can also be co-located without wall outlets/sockets. All these devices can be located strategically, including near exit points themselves. These devices can be connected wirelessly or via wires to the hub 310 and/or other signaling devices 314A-E and other devices placed strategically throughout the house 300. This configuration can be applied to all the rooms in the house 300 and/or each room can have a different configuration of devices.

In this example, a fire 301 occurs on the first level 302. Signaling device 314E in the first bedroom 306 can receive a current condition of the fire 301 from the hub 310 that is located on the first level 302. The hub 310 can determine that a fire is present on the first level 302 by using sensors (i.e., temperature, infrared) that measure current conditions in real-time. The hub 310 can also be in communication with sensors on the first level 302 that are configured to determine real-time conditions and transmit those conditions to the hub 310 and the other signaling devices 314A-E. The presence of the fire 301 can be determined, for example, based on one or more received temperature readings being more than a threshold temperature.

As another example, the hub 310 can receive a fire indication signal from one or more smoke detection devices located on the first level 302. Other fire detection approaches can include IR (Infra-Red) fire detection and rate of rise temperature detection. Fire indication information can indicate which location(s) in the house 300 is on fire (or sufficiently close to a fire so as to be avoided by occupants of the house 300).

Once the signaling device 314E receives a notification that the fire 301 is present and where it is located, the signaling device 314E selects one of the strategies 318 and 312 for an occupant 350 to safely egress from the house 300, using techniques previously mentioned (refer to FIG. 1). In this example, the signaling device 314E selected the second strategy 318, which then is reflected as the signaling device 314E's first choice 366. The second strategy 318 is to direct the occupant 350 out a window 338.

In the example of FIG. 3A, at time t=0, the signaling device 314E selected the second egress strategy 318 because based on real-time conditions of the fire 301, the occupant 350 may not have enough time to safely egress from the house 300 if the occupant 350 is instructed to take the first egress strategy 312 out of the house 300 through a front door 330. The server 100 described in reference to FIG. 1 had already simulated fires like that depicted in FIG. 3A and determined using predictive analytics how the occupant 350 would egress based on that occupant's age, agility, and other information. Therefore, all the signaling device 314E had to do in real-time was determine which of the modeled egress strategies would match up with the current, real-time conditions of the fire 301 in this scenario.

In some implementations, a temperature along the first egress strategy 312 can reach an untenable level even if a point along the strategy 312 down the stairs 303 is not yet too hot. Thus, the safest exit is via the second egress strategy 318, out the window 338. The signaling device 314E can make this determination and strategy selection in real-time based on collecting temperature readings from other devices/sensors along each of the egress strategies 312 and 318. In some implementations (not depicted), a door that is opened and/or closed can also change the signaling device 314E's determination of which egress strategy to select. For example, if a fire starts in the bedroom 306 and an occupant is in the bedroom 308, wherein both doors 332 and 334 are closed, a signaling device in the bedroom 308 can determine that there is enough time for the occupant to escape through the hallway 304, down the stairs 303, and through the front door 330. The signaling device in the bedroom 308 can make this determination based on the fact that the door 332 is closed (i.e., sensors, like the sensor 337, placed around the door 332 determine whether it is open or closed), which can increase the amount of time it would take for (1) the fire to spread from the bedroom 306 and into the hallway 304 and (2) a temperature of the hallway 304 to raise to an untenable level. Moreover, if the door is made of hollow-core or solid-core construction, that condition can also change the signaling device's determination of whether an egress strategy through the hallway 304 is safe and appropriate. It is worth noting that such a determination can also be made by the server 100 as depicted in FIG. 1, step B when simulating fire scenarios. In another example of a similar situation, if the door 332 is open, then the signaling device in the bedroom 308 can determine that the fire will quickly spread into the hallway 304 and the temperature in the hallway 304 will rapidly increase to an untenable level before the occupant can escape from the bedroom 308. Consequently, the occupant in the bedroom 308 should not escape through the door 334. Instead, the signaling device in the bedroom 308 can select a modeled egress strategy from the list that leads the occupant out through a window 342 in the bedroom 308.

In a scenario such as that depicted in FIGS. 3A-C, if all occupants are on the second level of the house 300 when the fire 301 is on the first level 302, signaling devices on the second level can work together to determine which egress strategy is optimal for all occupants to exit safely together. This determination can depend on the number of occupants on the second level, their ages and physical abilities, and a particular layout of rooms on the second level. Signaling devices in different rooms can select the same egress strategy out of the house 300 but can provide occupants in each of the rooms with particular instructions to exit those rooms and meet, for example, in the hallway 304 to finish exiting together. For example, this would be advantageous where a disabled occupant needs help egressing out of the house 300.

In other scenarios, one occupant can receive instructions from a signaling device that direct the occupant to another occupant who is disabled or in need of some form of assistance to safely egress out of the house 300 (refer to FIG. 1). The signaling devices can identify which occupants are in what rooms in real-time. The disclosed system can access information stored about each of the occupants. That stored information can form profiles for each occupant of the house 300 and can include an age of the occupant, any disabilities, an agility level, etc. The signaling devices and/or the disclosed system can use such information (e.g., occupant profiles) to determine how each occupant can safely egress from the house 300 and whether that occupant would need assistance from another occupant in the house 300. If assistance would be needed, the disclosed system can determine egress strategies that involve one or more occupants getting to and assisting the disabled occupant out of the house 300, both safely and quickly. Based on these determinations, the signaling devices can receive such egress strategies and their associated instructions. During a fire scenario, the signaling devices can then select an optimal egress strategy, whether it requires occupants to egress individually, in pairs, and/or in teams, and provide the associated instructions to occupants in the house 300.

In implementations where an infant or toddler is in the house 300, a signaling device can select the appropriate egress strategy that will account for, and instruct, an occupant to get the infant or toddler and safely exit together. In yet other implementations, visitor information (e.g., age, agility level, familiarity with the house 300, disabilities, etc.) can be provided to the disclosed system. This information can be provided by an occupant of the house 300 via a user computing device, a signaling device, and/or the hub 310. Once the visitor information is received by the disclosed system, the disclosed system can use such information to determine potential egress strategies for that visitor and whether the visitor would need assistance to egress in the event of a fire.

In yet other scenarios (not depicted), the signaling device 314E may select the second strategy 318 but something that is unpredicted can occur, such as the window 338 blowing out in the time it took the occupant 350 to get out of the bed. If such an unpredicted event was not previously predicted and considered in determining which egress strategy to select in real-time, then the signaling device 314E can make a correction and select a new egress strategy within seconds. In this case, where the signaling device 314E initially selected the second strategy 318, the signaling device can now make a selection correction and select the first strategy 312. In that case, the signaling device 314E can provide updated instructions to guide the occupant 350 out the front door rather than through the window. Regardless, the use of predictive analytics, an abundance of data, and AI in the system and techniques described throughout this disclosure greatly reduce the need for correcting an egress strategy selection in real-time.

Still referring to FIG. 3A, once the signaling device 314E selects an egress strategy (in this case, it is the second strategy 318), the occupant 350 is instructed by the signaling device 314E to "exit the room through the window" (316). In this example, the outputted instructions are verbally communicated to the occupant 350. In other implementations, the outputted instructions can be communicated to the occupant 350 by using lights and/or LED strips that illuminate a path out of the house 300. In this example, multiple other signaling devices can also produce audio outputs to remind the occupant 350 to exit through the window 338 (i.e., signaling device 314C in the hallway 304 verbally outputs "Go back to your room and exit through the window" (320), signaling device 314A near the stairs 303 verbally outputs "The fire will spread. Go back to your room and exit through the window" (324), and the hub 310 on the first level 302 near the front door 330 verbally outputs "Fire on the first level!"). This is beneficial in the event that the occupant 350 leaves the bedroom 306 despite instructions signaling for the occupant 350 to leave through the window 338 in the bedroom 306. FIGS. 3A-C indicate examples of outputted instructions but in each implementation of the disclosed system, the instructions can vary, as demonstrated.

The signaling devices 314A-E can emit multi-colored, strobing, LED (Light Emitting Diode) laser light, and can be mounted low, at exit points (i.e., door, window) in each room. LED guiding lights can be mounted low in outlet-type components and/or along pathways leading to egresses from the house 300. As mentioned, the signaling devices 314A-E can also emit various audio and visual cues to occupants, for example. For instance, the signaling device 314E can include flashing lights that may indicate a direction the occupant 350 is to take to proceed to (or stay on) the selected egress strategy 318 out the window 338. A series of flashing lights (i.e., in a hallway) can also indicate a presence and direction of the selected egress strategy. Moreover, the signaling devices 314A-E can be placed on doors and windows to indicate the presence of respective doors and windows and to indicate whether a given door or window is part of an egress route. Different colors can indicate inclusion or exclusion of a given door, window, or pathway on an egress route.

For example, a flashing red signal (i.e., a red "X") on a doorway may indicate that the doorway is to be avoided (and the door kept shut). In the implementation depicted in FIG. 3A, the signaling device 314D or signaling device 314E can project a flashing red "X" over the door 332 so that the occupant 350 understands not to exit the bedroom 306. In another implementation, a flashing green light may indicate that a given door, window, or path segment is part of the selected egress route. In the example of FIG. 3A, the signaling device 314E can project the flashing green light on the window 338 to instruct the occupant 350 that he must exit through that window 338.

Audio instructions that are outputted by the signaling devices 314A-E can include a fire status description (i.e. "a fire has been detected downstairs"), directional clues (i.e. "go out of the door and to your left"), or more detailed instructions (i.e. "place a wet towel under the door and leave the door closed"). Audio instructions can be specific to the particular room in which an audio signaling device is located, based on the location of the room, the location of the detected fire, and a selected egress strategy.

Other types of signaling instructions and corresponding signals can be generated in the house 300. For example, information can be sent to mobile devices of occupants of the house 300 that directs the occupants to and on the selected egress route(s). The hub 310, secondary monitoring systems, and/or an application running on a mobile device may know where the mobile device (and associated user) are within the house 300, with respect to the fire 301 and the selected egress route(s). Such knowledge can be used to tailor instructions that are sent to and displayed (or played) on a given mobile device.

Other devices in the home may receive and present information related to the fire 301 and recommended evacuation of the house 300. For example, the hub 310 can communicate with various computing devices or displays located within the house 300. For example, the hub 310 can send information or signaling instructions to one or more desktop computing devices, smart televisions, or other devices located within the house 300. The computing devices can be configured to display information (i.e., a fire warning, egress route information), based on information received from the hub 310. In some implementations, the hub 310 can remotely control (i.e., turn on) devices that include a display, and instruct the devices to display (and/or play) information useful for evacuation of the home 300, such as egress route information that is specific to the location of the fire 301 and the location of the respective device (i.e., a smart television in the lower level 302 may display different information from a smart television in the bedroom 306)

FIG. 3B is a depiction of the house 300 at time t=1. This example demonstrates where a hypothetical occupant 370 would be had he taken the first predicted egress strategy 312 to exit through the front door 330 of the house 300. As depicted, the fire 301 has moved closer to the front door 330. Therefore, the signaling device 314E accurately predicted, at time t=0, where the fire 301 would spread at time t=1 to then select the optimal egress strategy (the second strategy 318 out the window 338) to safely exit the house 300.

FIG. 3C is a depiction of the house 300 at time t=2. This example demonstrates that, at time t=2, the hypothetical occupant 370 would be running into the fire 301 that has now spread to the stairs 303 had the hypothetical occupant 370 been instructed to take the first predicted egress strategy 312 to exit through the front door 330. However, at time t=2, the occupant 350 has safely exited the house 300 through the window 338 by following the signaling device 314E's instructions 352 that are associated with the selected second egress strategy 318.

Figure 4:
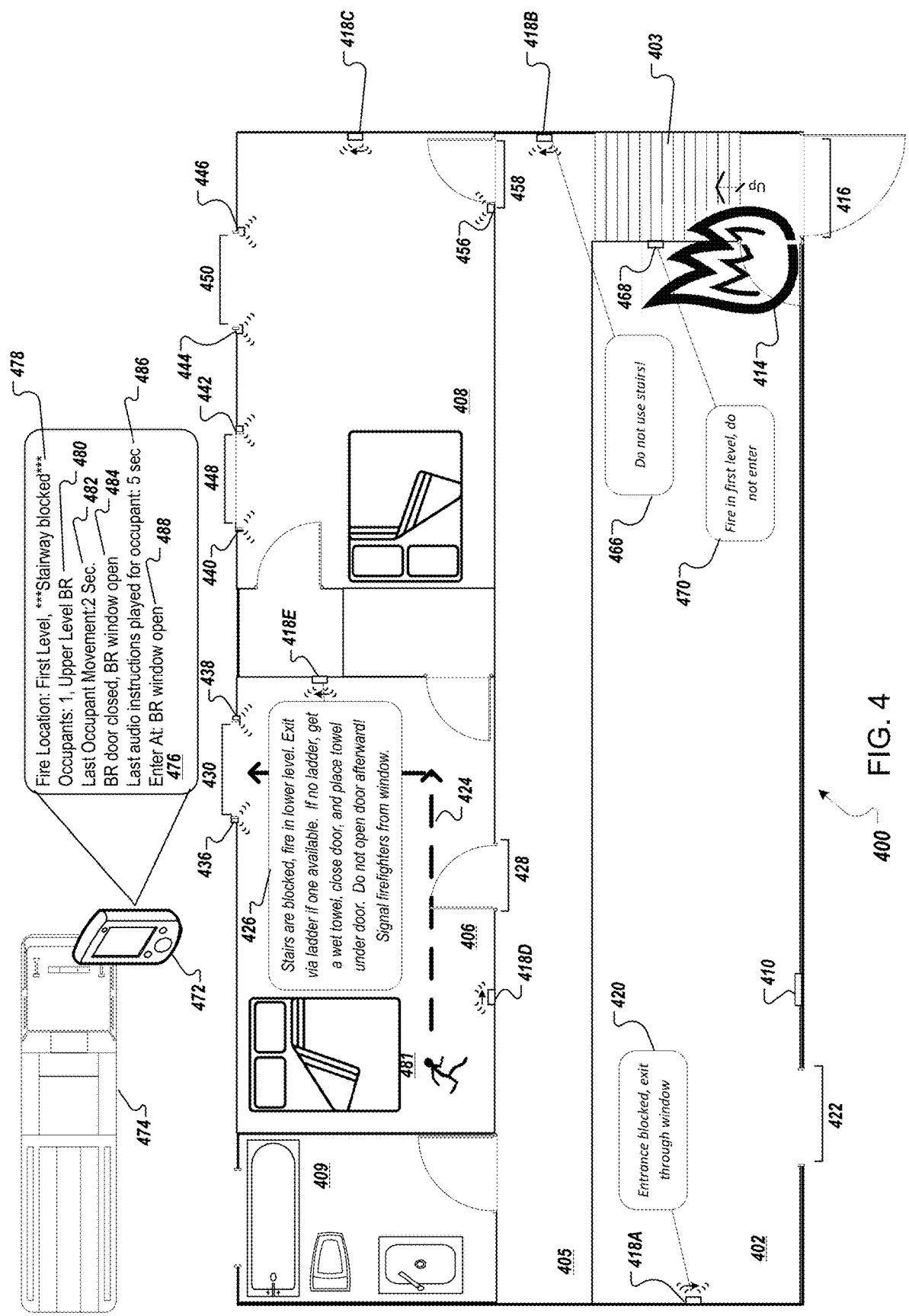
FIG. 4 is a conceptual diagram of yet another example floor map for which a predicted egress strategy is selected and used during an emergency.

FIG. 4 is a conceptual diagram of yet another example floor map for which a predicted egress strategy is selected and used during an emergency. This figure is another implementation of the scenario depicted in FIGS. 3A-C. In this implementation, a hub 410 can determine, and communicate to signaling devices 418A-E, that a fire 414 is blocking a stairway 403. The signaling device 418E can select egress strategy 424 from a list of preloaded, predicted egress strategies associated with exiting bedroom 406 and instruct an occupant 481 in the bedroom 406 to exit through window 430. The occupant 481 can receive an audio message 426 from the signaling device 418E that instructs the occupant 481 about what to do as part of the selected egress strategy 424. For example, the audio message 426 can direct the occupant 481 to use a ladder, if available, to exit through the window 430. If the ladder is not available, the audio message 426 can direct the occupant 481 to get a wet towel, place it under a door 428, close the door 428 (and not subsequently open it), and signal firefighters from a window (i.e. the window 430). These types of audio instructions are beneficial in scenarios in which the occupant 481 is in a room on a second level of the house 400 and the occupant 481 cannot safely egress down the stairs 403. These audio instructions are also beneficial in scenarios in which fire fighters and/or other emergency assistance is on its way to help the occupant 481.

Referring back to the example where the signaling device 418E instructs the occupant 481 about getting the wet towel, based on known locations of the fire 414 and a bathroom 409, the signaling device 418E can determine that the occupant 481 has time and access to retrieve the wet towel before closing the door 428. The signaling device 418E may also know that the door 428 is currently open (i.e., based on information provided by one or more sensors surrounding the door 428), and can direct the occupant 481 to get the wet towel based on the door 428 being currently open. If the signaling device 418E knows that the door 428 is currently closed, it can play an audio message that directs the occupant 481 to keep the door 428 closed.

Other signals can be emitted in the bedroom 406 to direct the occupant 481 on what to do during the emergency. For example, the signaling device 418E and a signaling device 418D can direct the occupant 481 towards the window 430 by emitting directional lights as disclosed throughout this disclosure. Further, devices 436 and 438 can also emit signals to indicate the presence of the window 430 (i.e., flashing lights, symbols above the window 430 indicating that the window 430 is the appropriate exit, green lights to indicate that the occupant 481 should go through the window 430, etc.).

Guidance similar to that provided in the bedroom 406 can be provided in other rooms throughout the house 400. For example, devices 440 and 442 and 444 and 446 can indicate the presence of a window 448 or a window 450, respectively. Signaling device 418C can emit a directional signal directing occupants to the window 448 and the window 450, and can play an audio recording (i.e., messages, instructions, etc.) that directs occupants to not use the stairway 403. A device 456 can also emit a signal indicating that a door 458 is not part of a selected egress route. As previously mentioned, each signaling device can select an egress strategy from the list of predicted, preloaded egress strategies associated with the room that each signaling device is located in. Therefore, in the example above, the signaling device 418C located in a bedroom 408 can select an egress strategy from the list of predicted strategies associated with the bedroom 408 that directs an occupant in the bedroom 408 out through the window 450. The signaling device 418C can use the same current conditions collected from other signaling devices and sensors throughout the house 400 as the signaling device 418E in the bedroom 406 to determine that an egress strategy out through the door 458 and down the stairway 403 would not be the optimal and safest exit route. Therefore, the signaling device 418C can select the egress strategy associated with the bedroom 408 that directs the occupant out the window 450, just like the signaling device 418E selected the egress strategy 424 associated with the bedroom 406 that directs the occupant 481 out the window 430.

Other signals can be played throughout the house 400. For example, signaling device 418B in a hallway 405 can play an audio messages 466 directing occupants to not use the stairway 403. A device 468 can also play an audio message 470 directing occupants to not enter a lower level 402. The various signals played by various devices in the house 400 can be emitted in response to egress strategies that each of the signaling devices 418A-E select.

In some implementations, as depicted in FIG. 4, fire fighter or other safety personnel can receive information provided by the hub 410. The hub 410 can send information to a fire fighter system or device and/or to a cloud service to enable the fire fighter system or device to retrieve the information from the cloud service. In some implementations, any of the signaling devices locate in the house 400 can transmit information and communicate with the fire fighter system. Information obtained from the hub 410 can be displayed, for example, on a fire fighter device 472, which can be a mobile device, as shown (i.e., in a fire truck 474 that is en route to the house 400).

The fire truck 474 may be en route, based on receiving an alarm from the hub 410. Information 476 displayed on the fire fighter device 472 includes fire location and stairway blockage information 478, number and location of occupants 480 (i.e., for an occupant 481), last occupant movement information 482, status 484 of doors and windows in the house 400, a timeframe 486 of when last audio instructions were played for occupants in the house 400, and an entrance suggestion 488 so that the safety personnel know how to safely enter the house 400. In addition or alternatively, the information 476 can include location(s) of fire hydrants. The information 476 can be used by the fire fighters to better respond to the fire situation in the house 400 and to safely enter the house 400.

The number and location of occupants 480 and the last occupant movement information 482 can be generated based on motion detection devices in the house 400. Such devices can be integrating into the signaling devices 418A-E or can be standalone/independent devices, such as devices 436, 438, 440, 442, 444, and 446. Fire fighters can tailor their emergency response based on information that indicates who may be in the house 400 and where they are located. Occupant movement information can be generated and sent to a cloud service, on a periodic basis, for example. Security measures can be implemented so that occupant movement information is only accessed by authorized personnel, and optionally, only in cases of an emergency (i.e., only fire fighters can view occupant status information and only after an alarm has been received from the hub 410 or any of the signaling devices 418A-E). For some cases, the hub 410 may know that no occupant movement has been detected, i.e., within the last forty-eight hours, which may indicate that the house 400 is not occupied. Such information can be shared with the fire fighter system, so that fire fighters know that the house 400 may not be occupied and thus can determine whether they need to endanger themselves by entering the house 400 (or a certain level of the house 400).

In some scenarios (not depicted), the house 400 can be vacant but the fire fighters still need to enter the house 400 to extinguish the fire before it spreads to other buildings, structures, and/or surrounding area(s). Consequently, the disclosed system can assist the fire fighters in assessing the danger of entering the burning house 400. For example, thermocouples and/or other types of sensing devices (e.g., smoke detectors, temperature readers, etc.) placed throughout the house 400 can be used to capture real-time conditions of a fire as it spreads through the house 400. The captured real-time conditions can be used by the disclosed system to determine whether the fire has spread. Consequently, the disclosed system can use this information to determine which windows, doors, exits, and/or entry points are still open and safe options for fire fighters to use when entering the house 400. Upon making this determination, the disclosed system can provide the possible entry points to the fire fighter system disclosed throughout and the fire fighters can then choose an entry point to safely enter the house 400. While the fire fighters are in transit to the house 400, the fire fighter system can also receive a floorplan for the house 400 from the disclosed system. The fire fighter system can also receive real-time updates about the fire pathway so that the fire fighters can use this information to determine which entrance to take into the house 400. It is also possible that the fire fighter system can automatically determine which entrance to take into the house 400 and then provide that information along with associated instructions to the fire fighters. Moreover, predictive analytics and AI can be used to predict flashovers. Flashovers are caused by radiative heat transfer from ignited materials in the interior of a room to its bounding surfaces in which pyrolysis on those surfaces releases particles and gases leading to sudden explosion. Therefore, by predicting where and when in the house 400 there may be flashovers, the disclosed systems can better determine an optimal and safe strategy/pathway for the fire fighters to enter the house 400. This can be beneficial to fire fighters whether they are entering a vacant burning house to prevent the fire from spreading and/or entering a burning house to save its occupants.

Referring back to FIG. 4, the fire fighter system can share information with the hub 410 and the signaling devices 418A-E, and the hub 410 may tailor guidance based on the received information. For example, an estimated fire fighter response time may be sent by a fire fighter system in response to an alarm received from the hub 410. The hub 410 and/or each of the signaling devices 418A-E can receive the estimated fire fighter response time. Based on the estimated response time, one or more of the signaling deices 418A-E can output additional instructions to the occupants (i.e., occupant 481). For example, if the expected response time is less than a threshold amount (i.e., less than two minutes), the signaling device 418E can play an audio message that directs the occupant 481 to open the window 430 and wave something out the window 430 to attract fire fighter attention. In other implementations, the signaling device 418E can be configured to start playing a sound or audio message to draw attention of fire fighters based on an estimated fire fighter response time. Estimated response times may be dynamically received, as mentioned, or may be predetermined and available to the signaling devices 418A-E and the hub 410 before the emergency.

Occupant movement information and information about known occupants may be used by signaling devices 418A-E to tailor guidance to occupants in the house 400. For example, if an occupant is detected in a room (i.e. the occupant is still sleeping), then one or more signaling devices 418A-E can play audio messages in other rooms that indicate that the occupant may still be in a particular room and in need of assistance. In yet other implementations, and as previously discussed, information about known occupants can be used by the signaling devices 418A-E to determine a selection of the optimal egress strategy from the list of predicted, preloaded egress strategies.

In some implementations, after fire fighter arrival, movement of fire fighters within the house 400 can be determined by movement detection devices in the house 400. Location information of fire fighters (and occupants) can be made available to and presented on the fire fighter device 472, for assisting the fire fighter team during the emergency response.

The entrance suggestion 488 can be determined by the signaling devices 418A-Es' selection of optimal egress strategies. For example, in FIG. 4, the signaling device 418E selected egress strategy 424 as the optimal egress strategy for the occupant 481 out of the bedroom 406. The instructions outputted by the signaling device 418E prompt the occupant 481 to exit through the window 430 if there is a ladder and if there is not, to wave something out of the window 430 to attract the attention of fire fighters. The signaling device 418E communicates with the fire fighter device 472 that the occupant 481 will be exiting through the bedroom window 430 (entrance suggestion 488). Receiving this information at the fire fighter device 472 makes for faster and safer response time during an emergency. In other words, when fire fighters arrive at the house 400, they will not have to spend valuable time determining what is the best entrance into the burning house 400 and where the occupant 481 is located in the house 400. In scenarios where a signaling device must make one course correction, the information about the entrance suggestion 488 can be updated and transmitted to the fire fighter device 472 in real-time such that no time is lost for the fire fighters to safely assist the occupant 481. In some implementations, as depicted in FIG. 4, the entrance suggestion 488 can also provide some sort of indicator to make it easier for the fire fighters to identify the entrance point when they arrive at the scene. For example, in FIG. 4, the fire fighter device 472 receives information that the bedroom window is open. In other examples, the device 472 can receive information about what corner/area/front/back/side of the house 400 that the fire fighters should enter, what level of the house 400, whether a door or window is open or closed, whether something is coming out of the door or window to indicate it as an entrance, whether lights emitted from inside the house 400 indicate an entrance (i.e., LED light strips attached on top of the molding of a window), etc.

Figure 5:
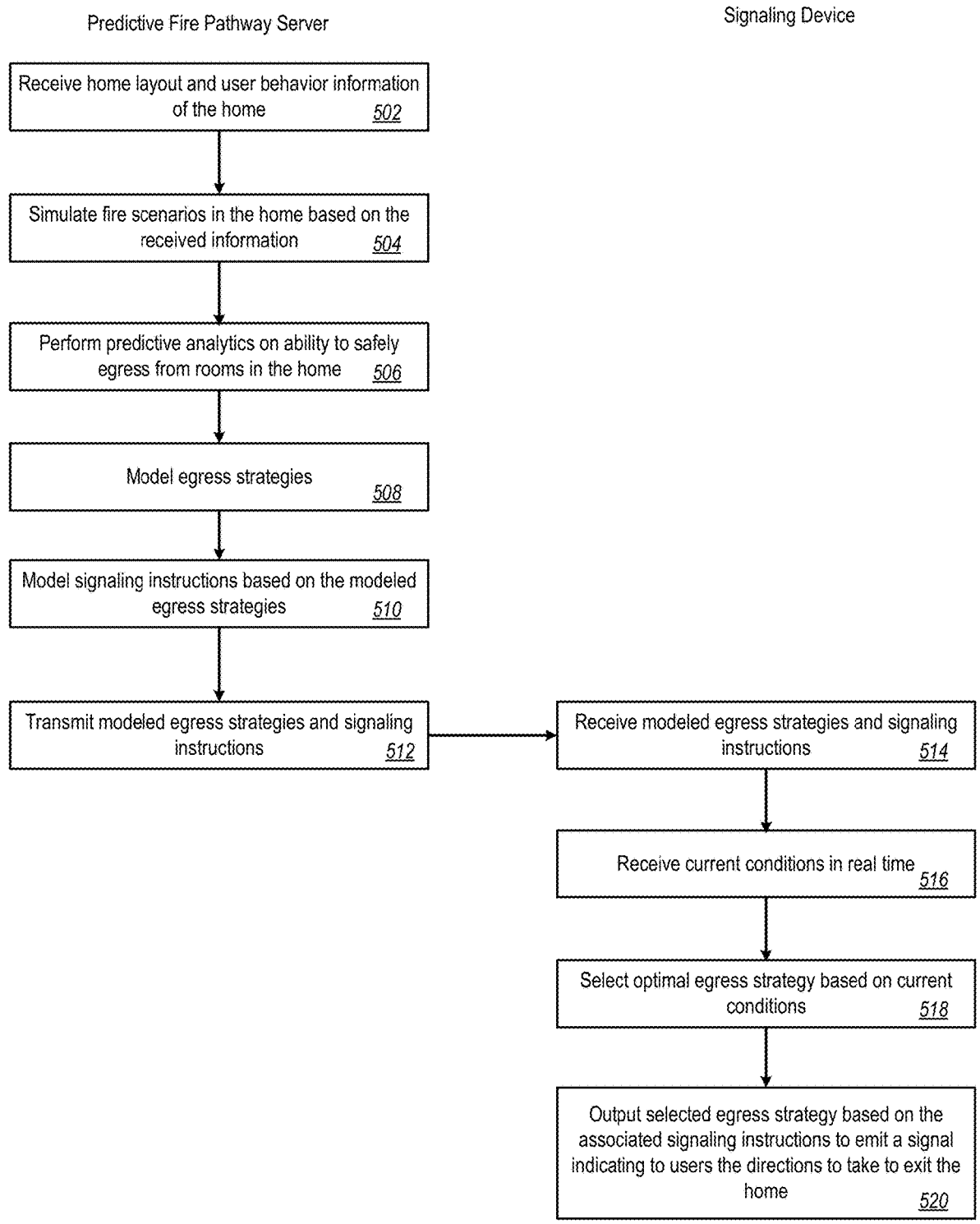
FIG. 5 depicts a flowchart of an example technique for predicting egress strategies and selecting the optimal egress strategy during an emergency.

FIG. 5 depicts a flowchart of an example technique for predicting egress strategies and selecting the optimal egress strategy during an emergency. The technique described can be performed by the predictive pathway server 100 and each of the signaling devices 108A-D of FIG. 1. First, in step 502, the server receives home layout and user occupant information. As discussed, this information can be inputted by occupants through the hub device (refer to FIG. 1 step A). This information can also be transmitted directly to the server by a homebuilder when the house is being constructed and/or when the signaling devices and hub are being installed in the house.

Next, in step 504, the server can simulate fire scenarios in the house based on the information received in step 502 (refer to FIG. 1, step B). The server also performs predictive analytics on an ability for occupants to safely egress from rooms in the home in step 506 (refer to FIG. 1, step C). Based on the simulations and predictive analytics, the server can then model egress strategies in step 508 (refer to FIG. 1, step D). As previously described, the server can create a list of egress strategies for each room in the house that are based on the ability of occupants in the house to safely egress from the house during an emergency.

Once egress strategies are modeled, the server can model signaling instructions that are associated with each of the modeled egress strategies in step 510 (refer to FIG. 1, step E). In this step, the server can create both audio and visual signaling instructions or one or the other. Next, in step 512, the server can transmit the modeled egress strategies and associated signaling instructions to each signaling device (refer to FIG. 1, step F). Each signaling device receives the list of modeled egress strategies and signaling instructions that are associated with the particular room that the signaling device is located in (514). For example, if the signaling device is located in the kitchen, then it will only receive a list of predicted egress strategies and signaling instructions for an occupant to exit from the kitchen. Likewise, if the signaling device is located in a first bedroom, that signaling device will receive a list of egress strategies and associated signaling instructions for an occupant to exit from the first bedroom.

Once each signaling device preloads the list of egress strategies, the signaling devices can receive current conditions in real-time in step 516 (refer to FIG. 1, step G). As previously discussed, each signaling device can detect current conditions itself and/or it can communicate, wireless or wired, with the hub, other signaling devices, and/or other devices in the house (i.e., smart thermostat, temperature sensors, smoke detector, motion detector, etc.) about current conditions in any room in the house. Based on the current conditions, for example, a fire started in the kitchen, the signaling device can select an optimal egress strategy from the preloaded list of egress strategies in step 518 (refer to FIG. 1, step H). The primary goal is that due to the simulations and predictive analytics performed beforehand by the server in steps 504-506, the signaling devices can select the optimal egress strategies without having to correct those selections in real-time.

Once an egress strategy is selected, the signaling device outputs the selected egress strategy based on the associated signaling instructions in step 520 (refer to FIG. 1, Step I). As discussed, the signaling device can emit a signal, such as lights and/or audio, that indicate to the occupant the directions to take to exit the home quickly and safely.

Figure 6:
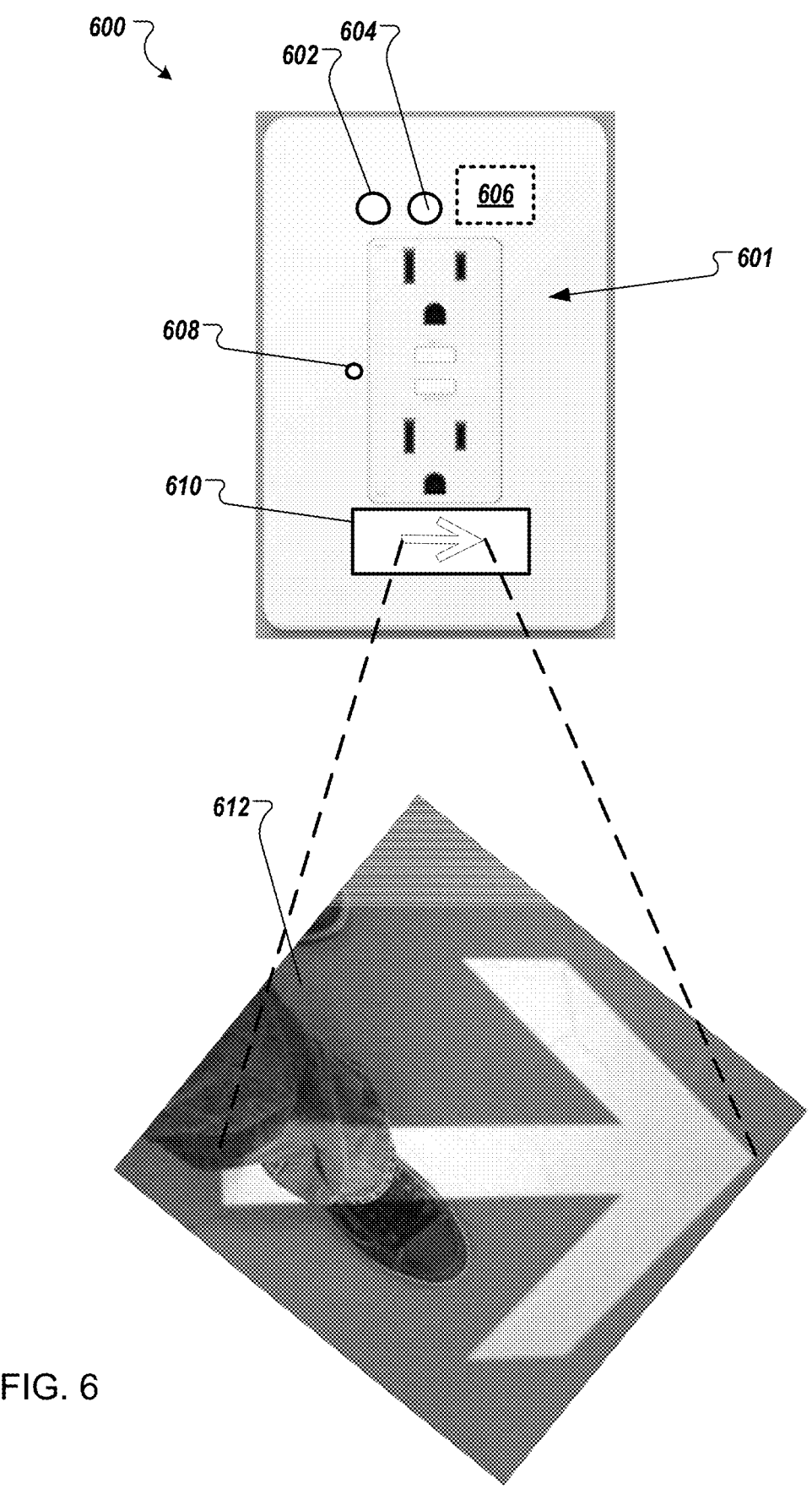
FIG. 6 is an example apparatus for providing emergency guidance and advisement.

FIG. 6 is an example apparatus 600 for providing emergency guidance and advisement in accordance with this present disclosure. In this implementation, the apparatus 600 is configured as an electrical power outlet that includes one or more receptacles 601. The apparatus 600 can be configured to include a user detection device, a fire detection device, and a signaling device (i.e., signaling devices 108A-D in FIG. 1), which are devices depicted in the previous figures. In other implementations, the apparatus 600 can be configured to implement one or more of the user detection device, the fire detection device, and the signaling device, with or without other functionalities.

The apparatus 600 includes a user detector 602, a fire detector 604, a communication device 606, a speaker 608, and a display device 610. The user detector 602 can be configured for, or be part of, the user detection device. For example, the user detector 602 operates to detect user motion or presence around the apparatus 600 over time. The user motion or presence can be recorded locally in the apparatus 600 and/or in one or more remote computing devices. As described herein, the user detector 602 can be of various types, such as motion sensors and cameras. In addition or alternatively, the user detector 602 can include a door/window sensor, door/window locks, etc.

The fire detector 604 can be configured for, or be part of, the fire detection device, and operates to detect presence and location of fire. Information on the fire presence and location can be recorded locally in the apparatus 600 and/or in one or more remote computing devices. As described herein, the fire detector 604 can be of various types, such as a smoke detector and a heat sensor (i.e., a temperature sensor, an infrared sensor, etc.).

The communication device 606 is included in the apparatus 600 and configured to enable data communication with the hub and other signaling devices. The communication device 606 can include a wireless or wired data communication interface.

The speaker 608 and the display device 610 can be configured for, or be part of, the signaling device. The speaker 608 operates to generate sounds, such as audible cues, horns, or verbal messages for egress guidance. The speaker 608 can be used to supplement other fixed audio devices or act as a substitute if fixed audio devices are not functioning. Such sounds can complement visual signs in situations where smoke intensity can diminish or preclude the ability to see the visual signs. The display device 610 operates to display visual signs that can guide a user along a selected egress route. In some implementations, the display device 610 includes a display screen that is provided in the apparatus 600 and displays information with visual signs thereon. In addition or alternatively, the display device 610 operates as a projector that projects a lighted sign on another object, such as a wall, a floor, or a ceiling. In the illustrated example, the display device 610 projects a lighted arrow 612 on the floor to guide the direction in the selected egress route.

Figure 7:
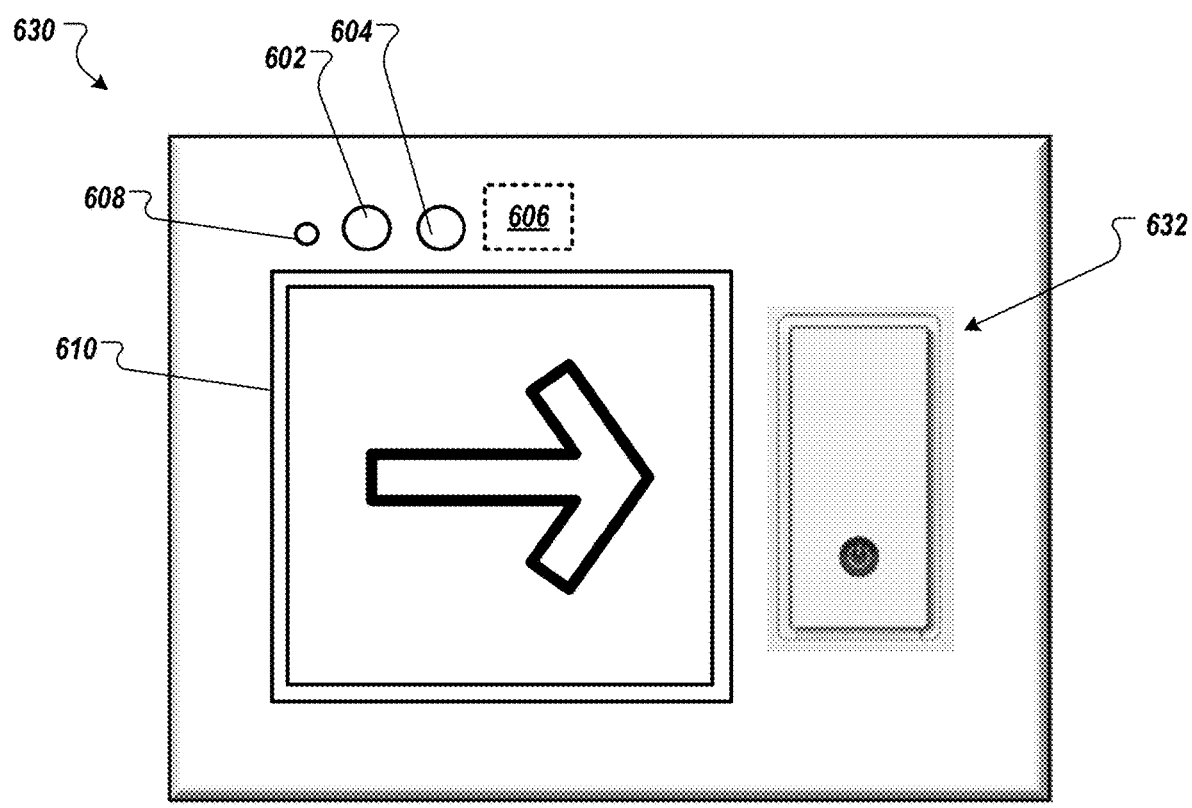
FIG. 7 is another example apparatus for providing emergency guidance and advisement.

FIG. 7 is another example apparatus 630 for providing emergency guidance and advisement in accordance with this present disclosure. The apparatus 630 is configured similar to the apparatus 600 except that the apparatus 630 is implemented as an electrical switch having a switch button 632. Similar to the apparatus 600, the apparatus 630 can include at least one of the user detector 602, the fire detector 604, the communication device 606, the speaker 608, and the display device 610. As the apparatus 630 is similar to the apparatus 600, the description of the apparatus 600 is incorporated by reference with respect to the apparatus 630.

Figure 8A:
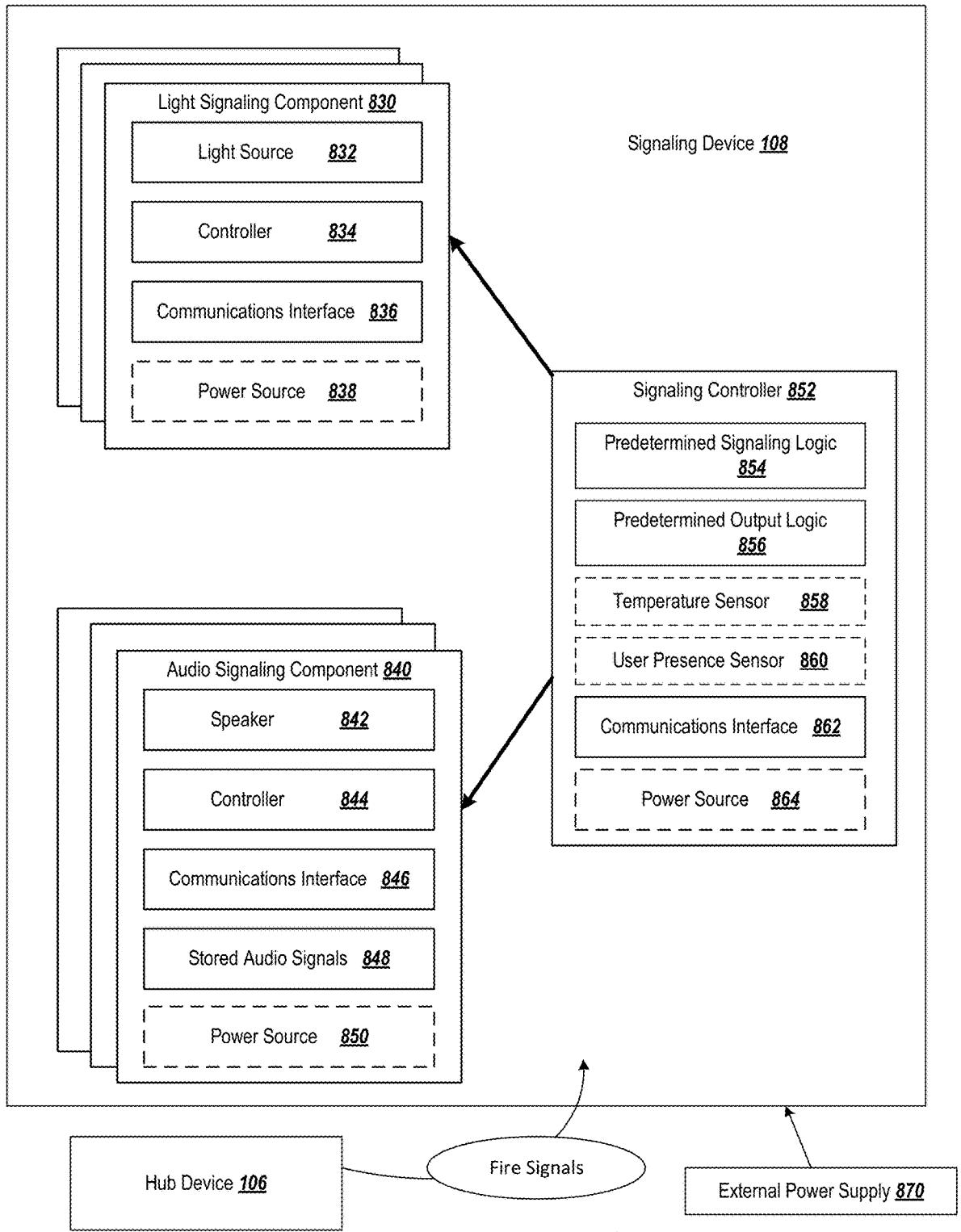
FIGS. 8A-B depict exemplary systems for providing emergency guidance and advisement.

FIG. 8A depicts another example system for providing emergency guidance and advisement. The signaling device 108 of FIGS. 1-2 is used as an example in FIG. 8A. The signaling device 108 can be a singular device, as depicted in FIG. 8A, or it can optionally be spread out physically with separate components that can be in wired or wireless communication with each other (refer to FIG. 8B). In this example in FIG. 8A, the signaling device 108 includes a light signaling component 830, an audio signaling component 840, and a signaling controller 852. In some implementations, the signaling controller 852 can have a one-to-one ratio of communication. Alternatively, in some implementations, the signaling device 852 can have a one-to-multiple ratio of communication. The audio signaling component 840 and/or the light signaling component 830 can optionally be integrated into/part of a same housing unit and/or circuit board as each other, the signaling controller 852, and/or the entire signaling device 108 as a whole. Alternatively, and in some preferred implementations, each of the components in FIG. 8A, 830, 840, and 852, can be housed separately (i.e., separate devices; refer to FIG. 8B). In yet other implementations, the controller 852 can be in the same housing with the light signaling component 830 and the audio signaling component 840 can be housed separately. In other implementations, the controller 852 and the audio signaling component 840 can share the same housing unit/circuit board while the light signaling component 830 is arranged separately. Moreover, in some implementations, the components 830 and 840 can be housed in the same unit and the signaling controller 852 can be housed separately.

In the example of FIG. 8A, the components 830 and 840 are housed in the same unit (i.e., the signaling device 108) as the signaling controller 852. Optionally, the signaling device 108 can have an external power supply 870 (i.e., lithium battery). The signaling device 108 can also receive fire signals from the hub device 106 as described throughout this disclosure (refer to FIGS. 1-2). The signaling controller 852 can communicate directly with the light signaling component 830 as well as the audio signaling component 840.

The signaling controller 852 can include a predetermined signaling logic 854, a predetermined output logic 856, a temperature sensor 858, and a user presence sensor 860, as previously discussed in reference to FIG. 2. In some implementations, the controller 852 may not have sensors 858 and 860, and can instead collect sensor information regarding a temperature and/or user presence from sensors placed throughout the house and/or other signaling devices in the house. The controller 852 further can include a communications interface 862 to facilitate communication (i.e., wired or wireless) with the other components, 830 and 840, comprising the signaling device 108. The communications interface 862 can also facilitate communication between the signaling device 108, the hub device 106, other signaling devices throughout the house, and sensors in the house. The signaling controller 852 can also optionally include a power source 864 (i.e., battery) in order to power the signaling controller 852 and/or the signaling device 108.

The light signaling component 830 can include a light source 832, a controller 834, a communications interface 836, and an optional power source 838. The light source 832 can be any form of lighting, including but not limited to an LED light strip (refer to FIG. 8B). The light source 832 can emit different colors, patterns, symbols based on signaling instructions communicated to the light signaling component 830 by the signaling controller 852. The controller 834 can be configured to activate the light source 832 based on receiving an activation signal/instruction from the signaling controller 852. The communications interface 836 is configured to allow the light signaling component 830 to communicate with the signaling controller 852. As mentioned, the power source 838 can power the light signaling component 830. In some implementations, the component 830 may not include the power source 838 and can instead rely on power from the external power supply 870 that provides power to the signaling device 108 as a whole.

The audio signaling component 840 can include a speaker 842, a controller 844, a communications interface 846, stored audio signals 848, and an optional power source 850.

Figure 8B:
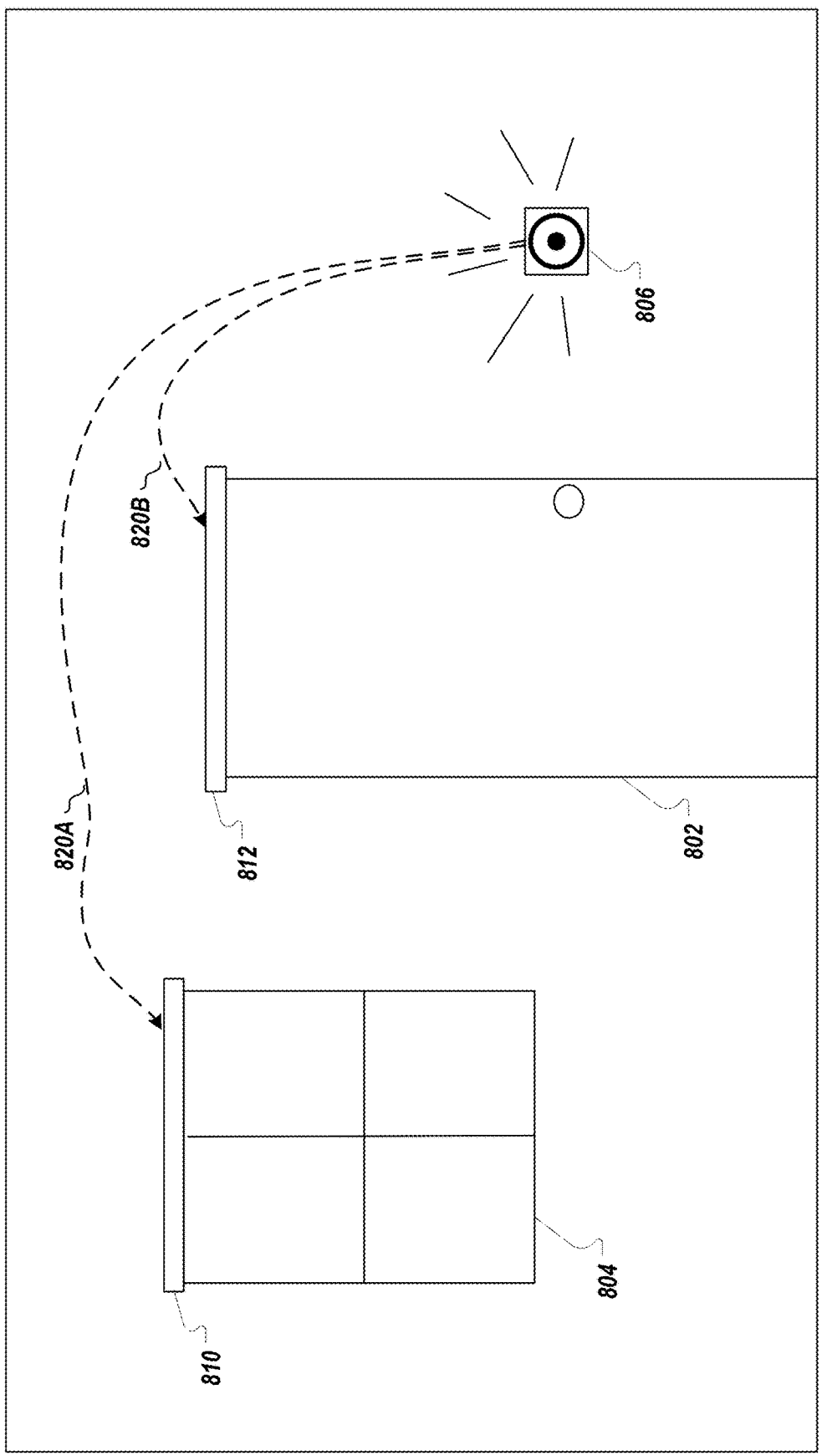

The speaker 842 can be any form or mechanism to output audio cues/instructions (refer to FIG. 8B). The speaker 842 can emit audio/verbal instructions to a user in the house based on signaling instructions communicated to the audio signaling component 840 by the signaling controller 852. The controller 844 can be configured to activate the speaker 842 based on receiving an activation signal/instruction from the signaling controller 852. The communications interface 846 is configured to allow the audio signaling component 840 to communicate with the signaling controller 852. The audio signaling component 840 can further include the stored audio signals 848, which can include a plurality of verbal instructions that are associated with each possible egress strategy out of a room that the signaling device 108 is located within. Therefore, when the signaling controller 852 transmits an activation signal to the audio signaling component 840, the activation signal can indicate which of the stored audio signals from the stored audio signals 848 should be played. Then, the controller 844 can activate the speaker 842 by having the speaker output the selected audio signals from the stored audio signals 848. As mentioned, the power source 850 can power the audio signaling component 840. In some implementations, the component 840 may not include the power source 850 and can instead rely on power from the external power supply 870 that provides power to the signaling device 108 as a whole.

FIG. 8B depicts an example system for providing emergency guidance and advisement. In this example room 800, a door 802 is fitted with a first LED strip 812. The first LED strip 812 can be attached on top of a molding of the door 802 or anywhere else along a perimeter of the door 802. A window 804 is also fitted with a second LED strip 810, which can be attached on top of a molding of the window 804 or anywhere else along a perimeter of the window 804. This way, the first and second LED strips 812 and 810 are not visible to an occupant or at least are not prominently displayed in the room 800.

In this example, a signaling device 806 is also configured to a wall of the room 800. The signaling device 806 can be retrofitted into an existing socket in the wall. In other implementations, the signaling device 806 can be a plug-in that is inputted into an outlet in the room 800. Here, the signaling device 806 supports audio output. Thus, the signaling device 806 communicates with the first and second LED strips 812 and 810 to display additional and/or alternative signals to an occupant during an emergency. The strips 812 and 810 and the signaling device 806 can communicate through a wired and/or wireless connection, as previously discussed throughout this disclosure, wherein a communication signal (i.e., activation signal) between the signaling device 806 and the first LED strip 812 is signal 820B and a communication signal between the signaling device 806 and the second LED strip 810 is signal 820A. During an emergency and once the signaling device 806 selects an optimal egress strategy, the signaling device 806 can communicate visual signaling instructions to the first and second LED strips 812 and 810 via the signals 820B and 820A, respectively.

For example, if the selected egress strategy requires the occupant to exit through the door 802, the signaling device 806 can prompt (i.e., send an activating signal) the first LED strip 812 to turn green, depict arrows, and/or flash. The signaling device 806 can also prompt the second LED strip 810 to turn red and/or depict "X" signals so that the occupant understands not to exit through the window 804. The signaling device 806 can optionally output audio messages instructing the occupant about how to exit in addition to the first and second LED strips 812 and 810 displaying visual signals for exiting the room 800.

The computing devices described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connectors that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols.

Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A system for determining egress guidance during an emergency in a building using artificial intelligence (AI) techniques, the system comprising:
    a plurality of sensors positioned throughout the building and configured to detect conditions in the building; and
    a computing system configured to determine egress guidance in the building using AI techniques, wherein the computing system performs operations comprising:
        receiving, from the plurality of sensors, information indicating the conditions in the building;
        detecting, based on processing the conditions in the received information, an emergency in the building;
        determining, based on applying AI techniques to the received information, scenarios indicating a plurality of potential spreads of the emergency in the building;
        generating, based on the determined scenarios in the building, egress guidance to assist users in safely egressing from the building, wherein the egress guidance includes at least one egress strategy instructing the users to move along a pathway in the building that avoids (i) the emergency and (ii) the plurality of potential spreads of the emergency in the building; and
        returning the egress guidance for presentation to the users in the building to assist the users to safely avoid the emergency.

2. The system of claim 1, wherein returning the egress guidance comprises transmitting instructions to a user device of a user amongst the users in the building that cause the user device to output the egress guidance at the user device.

3. The system of claim 1, wherein generating the egress guidance comprises: generating instructions for a user amongst the users to lead the users in safely egressing according to the at least one egress strategy.

4. The system of claim 1, wherein generating the egress guidance comprises: generating and returning instructions for a user amongst the users that directs the user (i) to a location of the users and (ii) to lead the users from the location to safety according to the at least one egress strategy.

5. The system of claim 1, wherein:
the users comprise at least one child, and
returning the egress guidance comprises transmitting the egress guidance to a user device associated with the at least one child.

6. The system of claim 1, wherein returning the egress guidance comprises transmitting instructions to an output device located within the building proximate a location of the users, wherein the instructions cause the output device to output the egress guidance to the users.

7. The system of claim 6, wherein returning the egress guidance further comprises:
determining, based on the received information, the location of the users in the building;
identifying the output device that is located within the building proximate the determined location of the users; and
transmitting the instructions to the identified output device.

8. The system of claim 1, wherein the computing system comprises a user device of at least one user amongst the users in the building.

9. The system of claim 1, wherein the computing system is remote from the building.

10. The system of claim 1, wherein the computing system is located within the building.

11. The system of claim 1, wherein the operations further comprise:
generating, based on the determined scenarios in the building, a plurality of egress strategies, wherein the plurality of egress strategies includes the egress guidance; and
selecting an egress strategy from amongst the plurality of egress strategies based at least in part on continuously received information from the plurality of sensors, the continuously received information indicating real-time conditions in the building as the emergency progresses.

12. The system of claim 1, wherein generating the egress guidance further comprises generating signaling instructions that are specific to the egress guidance.

13. The system of claim 1, wherein returning the egress guidance comprises returning instructions that cause a receiving device to visually or audibly output the egress guidance, wherein the receiving device comprises at least one of a user device of at least one user amongst the users, the computing system, and an output device in a location proximate the users in the building.

14. The system of claim 13, wherein audibly outputting the egress guidance comprises describing a pathway to exit the building that corresponds to the egress guidance.

15. The system of claim 13, wherein visually outputting the egress guidance comprises instructing LED lights to illuminate a pathway to exit the building corresponding to the egress guidance.

16. The system of claim 1, wherein the plurality of sensors include motion sensors.

17. The system of claim 1, wherein the building is a school.

18. The system of claim 1, wherein the building is a residential building.

19. The system of claim 1, wherein the building is at least one of an office building and a retail building.

20. A method for determining egress guidance during an emergency in a building using artificial intelligence (AI) techniques, the method comprising
receiving, by a computing system and from a plurality of sensors positioned throughout the building and configured to detect conditions in the building, information indicating the conditions in the building;
detecting, by the computing system and based on processing the conditions in the received information, an emergency in the building;
determining, by the computing system and based on applying AI techniques to the received information, scenarios indicating a plurality of potential spreads of the emergency in the building;
generating, by the computing system and based on the determined scenarios in the building, egress guidance to assist users in safely egressing from the building, wherein the egress guidance includes at least one egress strategy instructing the users to move along a pathway in the building that avoids (i) the emergency and (ii) the plurality of potential spreads of the emergency in the building; and
returning, by the computing system, the egress guidance for presentation to the users in the building to assist the users to safely avoid the emergency.

* * * * *